(12) United States Patent
Glimpel et al.

(10) Patent No.: US 7,399,231 B2
(45) Date of Patent: Jul. 15, 2008

(54) TOOL AND METHOD FOR PRODUCING A THREAD IN A TOOL

(75) Inventors: Helmut Glimpel, Lauf (DE); Dietmar Hechtle, Pegnitz (DE)

(73) Assignee: EMUGE-Werk Richard Glimpel GmbH & Co. KG, Lauf (DE)

( * ) Notice: Subject to any disclaimer, the term of this patent is extended or adjusted under 35 U.S.C. 154(b) by 281 days.

(21) Appl. No.: 11/295,668

(22) Filed: Dec. 7, 2005

(65) Prior Publication Data

US 2006/0121995 A1 Jun. 8, 2006

(30) Foreign Application Priority Data

Dec. 8, 2004 (DE) .................. 10 2004 059 264

(51) Int. Cl.
*B21J 13/02* (2006.01)
(52) U.S. Cl. .................. 470/204; 470/107; 470/199
(58) Field of Classification Search .................. 470/18, 470/96, 97, 105, 107, 198, 199, 204; 408/215, 408/222; 409/74, 78
See application file for complete search history.

(56) References Cited

U.S. PATENT DOCUMENTS

| | | | | | |
|---|---|---|---|---|---|
| 3,113,330 | A | * | 12/1963 | King et al. .................. | 408/216 |
| 4,259,889 | A | * | 4/1981 | Capuano .................. | 411/417 |
| 4,271,554 | A | * | 6/1981 | Grenell .................. | 470/204 |
| 4,539,832 | A | * | 9/1985 | Koller .................. | 72/118 |
| 5,944,462 | A | * | 8/1999 | Woodward .................. | 409/74 |
| 6,217,267 | B1 | * | 4/2001 | Sugano et al. .................. | 408/222 |
| 6,231,281 | B1 | * | 5/2001 | Nishikawa .................. | 408/222 |
| 6,460,435 | B1 | | 10/2002 | Meyer et al. | |
| 2001/0014625 | A1 | | 8/2001 | Glimpel et al. | |
| 2004/0179914 | A1 | | 9/2004 | Hakansson | |
| 2004/0185948 | A1 | | 9/2004 | Muller | |
| 2006/0068926 | A1 | | 3/2006 | Mann | |

FOREIGN PATENT DOCUMENTS

| | | |
|---|---|---|
| DE | 70 17 590 | 9/1970 |
| DE | 3934621 A1 | 4/1991 |

(Continued)

OTHER PUBLICATIONS

Glimpel et al., "Search Report EP 05 02 4970", Mar. 29, 2006.

(Continued)

*Primary Examiner*—Edward Tolan
(74) *Attorney, Agent, or Firm*—The Law Office of James E. Ruland, PLC

(57) ABSTRACT

The tool for producing a screw thread in a workpiece comprises
a) at least one thread-producing region, which comprises
a1) at least one thread-milling region, which operates by removing material, as well as
a2) at least one thread-forming region, which operates without the removal of material,
b) such that the thread-milling region(s) and the thread-forming region(s) of each thread-producing region
b1) are coupled or connected to one another in such a way that they rotate or can be rotated together about a tool axis, and
b2) are disposed along an outside circumference of the thread-producing region so as to be offset from one another, i.e. situated one behind the other or following one another, in a direction of rotation about the tool axis.

26 Claims, 19 Drawing Sheets

FOREIGN PATENT DOCUMENTS

| | | |
|---|---|---|
| DE | 196 49 190 | 5/1998 |
| DE | 199 58 827 A1 | 6/2001 |
| DE | 101 36 293 A1 | 2/2003 |
| EP | 1 072 348 | 1/2001 |
| WO | 02094491 A1 | 11/2002 |
| WO | 2004094094 A1 | 11/2004 |

OTHER PUBLICATIONS

V.P. Lopukhov, "Metal-Cutting Tools Experience In Using Taps With Cutting/Burnishing Teeth", "XP001073040", 1999, pp. 73-78, vol. 19, No. 11, Publisher: Allerton Press, New York, NY, US.

* cited by examiner

FIG 32
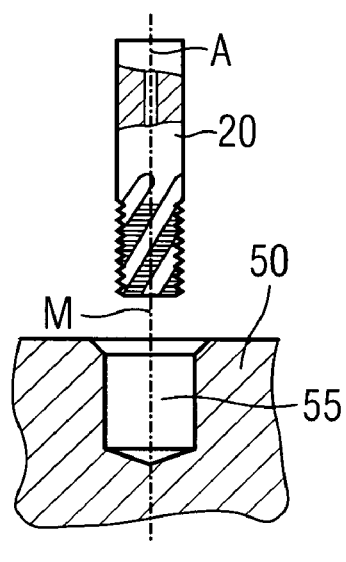
FIG 33
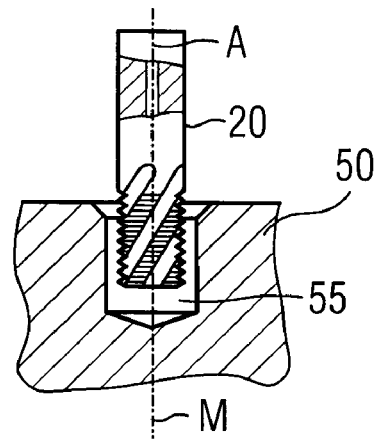
FIG 34
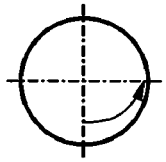
FIG 35
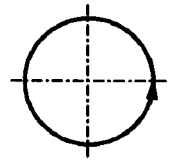
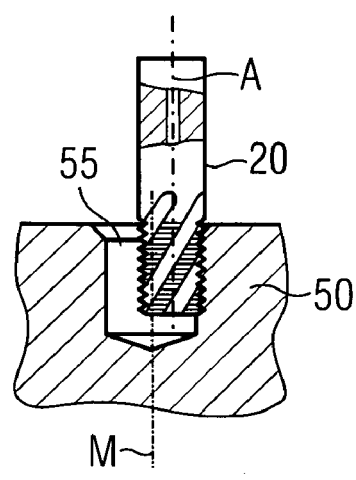
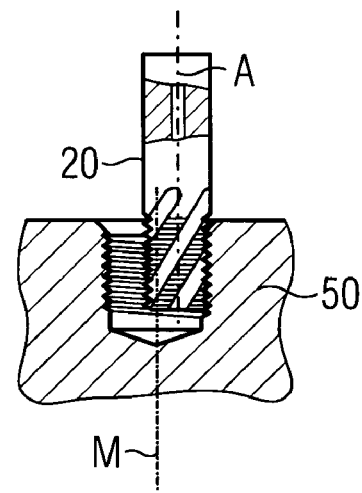

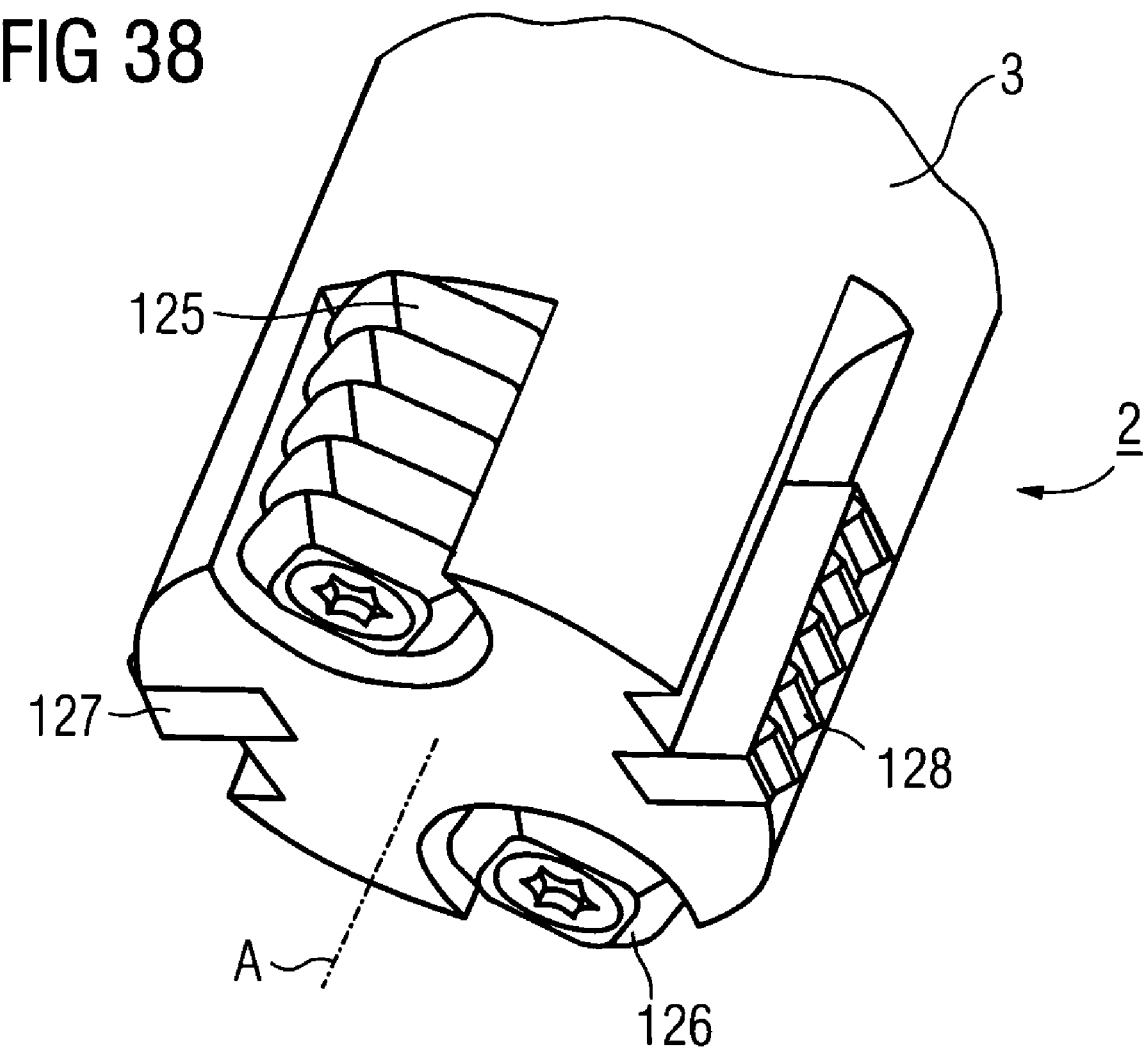

TOOL AND METHOD FOR PRODUCING A THREAD IN A TOOL

FIELD OF THE INVENTION

The invention relates to a tool for producing a thread as well as to a method for producing a thread.

BACKGROUND OF THE INVENTION

Of the known methods and tools used for creating or subsequent processing of a thread or screw thread, some operate by cutting away some of the workpiece material in the region of the thread turns, whereas others do not remove material. The latter are based on deformation of the workpiece, producing the thread turns therein by exerting pressure. A survey of the thread-producing tools and processing methods in current use can be found in the *Handbuch der Gewindetechnik and Frästechnik*, editor: EMUGE-FRANKEN, publisher: Publicis Corporate Publishing, year of publication 2004 (ISBN 3-89578-232-7), which in the following is referred to simply as "EMUGE-Handbuch".

The material-removing tools for thread production include thread tappers (cf. *EMUGE-Handbuch*, Chapter 8, pages 181 to 298) and milling cutters (cf. *EMUGE-Handbuch*, Chapter 10, pages 325 to 372) as well as, only for external threads, the threading die (cf. *EMUGE-Handbuch*, Chapter 11, pages 373 to 404).

A thread tapper is a thread-cutting tool that operates axially, with respect to the axis of the tool, with cutting edges disposed externally in a screw-shaped arrangement that depends on the pitch of the thread to be produced. During production of the thread the tapper is pushed forward axially into a bore in the workpiece, while rotating about the tool axis with a rotational velocity that depends on the forward velocity; in this process its cutting edges are permanently engaged with the workpiece at the wall of the bore (continuous cutting).

In the case of a thread milling cutter, several profiled ridges are offset from one another axially, with respect to the tool axis, in accordance with the pitch of the thread to be produced, but are not themselves oriented according to the thread pitch; these ridges are interrupted along the circumference by channels so as to form several cutting edges. To produce the screw thread the milling cutter is moved linearly forward along its tool axis while simultaneously making a circular movement about a central axis of the thread to be produced, or of the bore previously prepared in the workpiece, which results in a screw-like movement of the tool, the pitch of which corresponds to the pitch of the screw thread to be produced. In addition, the milling cutter is rotated about its own tool axis; the velocity of this rotation can be chosen from a broad range of values, so that it is independent of the velocity along the path of the screwing movement but is customarily distinctly higher than the latter. The cutting edges of the milling cutter engage the material of the workpiece intermittently, one after another (interrupted cutting). Thus the milling cutter is a circularly operating threading tool.

Among the thread-producing tools that do not remove material are thread forming tools such as the so-called thread-grooving tools sometimes also called thread rolling taps (cf. *EMUGE-Handbuch*, Chapter 9, pages 299 to 324) and thread rollers used only for external threads (cf. *EMUGE-Handbuch*, Chapter 11, pages 373 to 404).

Thread-grooving tools are threading tools that operate in an axial direction, with respect to the tool axis, by way of a region that forms a helix around the tool axis and forms the thread by applying pressure to the workpiece; that is, they operate by means of an external thread or thread profile that passes spirally or helically along the circumference of the tool and represents a counterpart to the shape of the screw thread that is to be created.

As a rule, a thread-grooving tool or thread-rolling tap has an approximately polygonal cross section, so that distributed along the external thread, which thus departs somewhat from a precisely cylindrical screw outline, and offset from one another there are additional outwardly projecting and in general rounded polygon corner regions, for which various terms can be used (e.g., pressure lugs, grooving teeth, forming teeth, forming wedges). These structures conform to the pitch of the helical thread profile. This configuration reduces the contact area, and hence the clamping forces, involved in in the thread-grooving process. The polygon in this case must have at least three corners or corner regions, because while in operation the thread-grooving tool or thread-rolling tap needs to be supported against the edge of the bore or the outer edge of the screw thread.

The outside diameter or cross section of the operating region of a thread-grooving tool or thread-rolling tap increases progressively, usually conically, from the front end of the tool throughout a starting or entrance region, which is the actual forming region, and then remains substantially constant in an adjacent calibration and/or guide region. As a result, the thread is created in a stepwise manner, as the teeth in the entrance region are pressed progressively deeper into the workpiece, and subsequently, if necessary, is smoothed or calibrated by the grooving teeth in the calibration region, which are all pressed in to the same depth.

In order to create a thread in a previously prepared bore, the operating region of the thread-grooving tool is inserted into the bore by being pushed forward in a linear movement axial with respect to the tool axis, i.e. the long axis of the tool shaft, while the tool is rotated about this tool axis. In this process the teeth or forming wedges or pressure lugs of the tool is thread are pressed into the surface of the workpiece, i.e. of the bore. The material of which the workpiece is made is pushed away, predominantly in the radial direction, i.e. perpendicular to the long axis of the bore. One part of the material thus deformed is made more compact, while another part is pushed into the depressions or channels between the forming wedges or teeth of the tool, which ultimately creates a screw thread in the workpiece.

In the following, these known thread-grooving tools or thread-rolling taps will also be termed "axial thread formers" and the corresponding procedure, "axial thread forming". Known exemplary embodiments of such axial thread formers can also be found in DE 101 36 293 A1, DE 199 58 827 A1, or DE 39 34 621 C2.

The document WO 02/094491 A1 discloses a non-cutting thread-forming tool and a method for creating a screw thread without removing material, based on an operational principle that can be called circular thread forming. The thread-forming tool disclosed in WO 02/094491 A1 is elongated and comprises an operating region with one or more annular circumferential profile(s) separated from one another by annular grooves. Each circumferential profile has a polygonal shape and comprises at least three elevations or lobes as corners of a polygon, as pressure lugs. In addition, axially oriented flutes can be provided between the individual pressure lugs on the outer surface of the tool, through which coolant fluid can flow.

In the method according to WO 02/094491 A1 this tool, while being rotated about its own axis, is inserted into a bore with diameter larger than that of the tool, where it makes a circular movement along the circumference of the bore and simultaneously a forward movement into the bore, in the process forming the screw thread in the bore with no removal of material.

The thread that results according to WO 02/094491 A1, in contrast to one made by an axial thread former, is thus not produced by means of an effective surface on the tool that has a spiral shape and is adapted to the thread pitch, during a forward movement of the tool relative to the workpiece that is solely axial or linear. Instead, it is produced on one hand by effective surfaces on the tool that are annular and hence have no pitch and are polygonal in cross section, and on the other hand by a helicoid movement of the tool, which results from a linear forward movement axial with respect to the long axis of the tool and a circular movement of the long axis of the tool about a central axis of the bore, combined with rotation about its own long axis. In the following this known thread former will also be called a circular thread former or, by extension of the customary nomenclature to date, a circular thread-grooving tool, and the associated method will be called circular thread forming or circular thread-grooving.

Furthermore, combination tools are known that act as both drill and thread milling cutter, operating exclusively by the removal of material. These tools, which are called thread drill and mill cutters (Bohrgewindefraeser=BGF) (cf. *EMUGE-Handbuch*, Chapter 10, page 354) and circular thread drill and mill cutters (Zirkularbohrgewindefraeser=ZBGF) (cf. *EMUGE-Handbuch*, Chapter 10, page 355), can be used to create the bore for the thread and the thread itself in the workpiece.

The BGF has a drill part at its front end, ahead of a milling-cutter section, so that as the drill part is moved axially forward, with respect to the tool axis, while rotatiing about the tool axis it drills out a bore in the previously intact material of the workpiece, and subsequently the milling cutter, by being displaced radially further outward and making a helical backwards movement, circularly creates an internal thread in the bore.

The ZBGF likewise comprises a drill part axially ahead of a thread-milling cutter, at the front end of the tool, but in contrast to the BGF the drill part here must be smaller in its radial dimensions than the milling-cutter teeth. With a single helical movement of the ZBGF into the previously intact material of the workpiece, while rotating about its tool axis, the ZBGF simultaneously produces the bore and the internal thread within the bore.

Finally, combination threading tools with a thread tapper and a thread-groover that operate entirely axially are also known, as are associated operating procedures for producing internal threads in previously created bores. In these combination tools a thread tapper and thread-groover are disposed on a tool shaft one behind the other, i.e. are axially offset along the tool axis. When the combination tool is pushed forward axially, along its tool axis, into the bore previously created in the workpiece while the tool is rotated about its tool axis with a rotational velocity that depends on the forward velocity so as to correspond to the desired thread pitch, the thread tapper does the initial cutting of the thread and the thread-groover completes the groove formed by the initially cut thread, in a single-step operation. Thread tapper and thread-groover are continuously engaged with the workpiece during the machining movement. Such an axial combination tool and an associated method are known from DE 70 17 590 U and DE 196 49 190 C2.

According to DE 196 49 190 C2 the material is first cut away with the thread tapper to produce a thread having flanks of precise profile and size, after which the following thread-groover is applied only to the base of this previously cut thread, so as to compress it to a predetermined final diameter by deformation, with no further removal of material. As a result, especially the first turns of the thread following the initial cut are made more resistant to vibration and less susceptible to breakage, in particular for threads to be used for fixation on gray-cast-iron housings of internal combustion machines.

The shaft of a threading tool of the kind cited above is, as a rule, usually shaped so as to be at least approximately cylindrical about its long axis, and/or is received by and clamped within the chuck of a tool machine by way of its end that is directed away from the workpiece.

SUMMARY OF THE INVENTION

One feature of the present invention is to create a new tool and a new method of producing a thread, in particular producing an internal thread.

This feature can be achieved with respect to the tool by the features given in claim 1, and with respect to the method by the features given in claim 22. Advantageous embodiments and improvements of the tool and the method in accordance with the invention will be evident from the claims dependent on claim 1 or claim 22, respectively.

The tool according to claim 1 is suitable for and intended to be used for the production (or: manufacture) of a thread in a workpiece (or in general: a body) and comprises a) at least one thread-producing region (thread-manufacturing region, operating region) or thread-producing section, which comprises
  a1) at least one thread-milling region or section as well as
  a2) at least one thread-forming region or section, which operates without the removal of material (or: generating of chips),
b) such that at least one thread-milling region and at least one thread-forming region(s) of at least one thread-producing region
  b1) are coupled or connected to one another in such a way that they can be or are rotated together about a tool axis, and
  b2) are disposed or arranged along an outer circumference of the thread-producing region in such a way as to be offset (or: arranged at an angular distance) from one another and/or to be positioned or situated one behind the other or following one another in a direction of rotation about the tool axis.

In the method according to claim 22 for producing a thread in a workpiece, a tool in accordance with the invention is moved in an operating movement that comprises a rotational movement of the tool about the tool axis in a predetermined direction of rotation,
  and a simultaneous screw-type (or: helical) movement of the tool with its tool axis about a central axis oriented parallel to the tool axis, i.e. a composite movement made up of an axial forward movement of the tool, with respect to the tool axis, and a simultaneous circular movement of the tool in which the axis of the tool rotates or circles around a central axis of rotation that runs parallel to the tool axis and preferably coincides substantially with a central axis of the thread that is to be or is being produced. The result is in particular a helical movement along a cylinder with the axis of rotation as the cylinder axis.

The tool for producing a thread in accordance with the invention is a combination tool that operates both by cutting or removing pieces of material and by forming (or: plastic deformation) without the removal of material. The invention is based on the consideration that a material-removing region and a material-conserving or chiplessly operating region are to disposed one after or behind the other in the direction of rotation, so that as the tool is rotated about its axis the material-removing and -conserving regions engage the workpiece in the same sequence or order in which they are disposed along the circumference of the tool. Therefore, it is in this sequence that, while a thread turn is being produced, it is alternately cut and then formed or, conversely, formed and then cut. Hence the regions that operate by removing material, i.e. the thread-milling regions, engage the workpiece only during part of the tool's rotational movement about its own axis. The regions that operate without removing material likewise, as thread-forming regions, engage the workpiece only during part of the rotational movement about the tool axis. Therefore, there is an intermittent or discontinuous operation of the tool and the method in accordance with the invention, by means of which a turn of the thread is simultaneously both milled out and formed. In particular, even after a forming step a milling region of the tool will have a cutting action on the thread turn, which has likewise not been previously known in the state of the art.

It is possible to arrange thread forming regions and thread-milling regions in a strictly alternating order so that between two thread forming regions there is always one thread-milling region in a circumferential or rotational direction and vice versa or in an alternating order where more than one forming regions and/or more than one milling regions are arranged one behind the other without an intermediate thread milling region or thread forming region respectively.

The concept of producing or manufacturing a thread, in the sense of the present application, comprises not only the direct creation of the entire thread in a previously smooth or thread-free surface of the workpiece, but also the additional incorporation or subsequent processing of a previously created (e.g., previously cut) thread (also called: initial thread, raw thread). The tool axis is ordinarily a long axis and/or the principal axis of inertia or Eigen axis of the tool or its shaft, and/or an axis that passes centrally through the tool.

The tool and the method in accordance with the invention are in particular suitable for creating both internal threads in an interior surface of the workpiece that is in general cylindrical but in special cases can also be spherical (shaped like the surface of a sphere or have another shape), and also external threads in an outer surface of the workpiece that is in general cylindrical but in special cases can be spherical or of a different shape. The operational movement (or: thread-producing movement) of the tool is in principle the same in both cases, differing merely in that for an internal thread the tool, while enclosed by the interior surface the workpiece, is moved along a path that is smaller than the thread to be created and is applied to the workpiece from its interior, whereas for an external thread the tool is outside the outer surface of the workpiece, and is moved along a path larger than the thread to be created and applied to the workpiece from outside.

In an especially advantageous embodiment the effective or active (or: operational) profile of each thread-producing region is adapted to, or even corresponds to, a predetermined nominal profile (or: predetermined final profile) of the thread that is to be produced. The effective profile of a thread-producing region (or: the overall effective profile) is defined as the profile of the rotational projection of all thread-milling regions and all thread-forming regions of this thread-producing region about the tool axis onto a projection plane that passes through or contains the tool axis. In other words, the effective profile of a thread-producing region is derived by rotational superposition of the individual profiles of all the thread-milling regions and all the thread-forming regions of this thread-producing region, as the tool is rotated about its axis. When the rotational projections of the thread-milling regions and thread-forming regions in a given thread-producing region are viewed on the same projection plane, the result is a superimposed or composite profile, the outer contour of which represents the effective profile of the entire thread-producing region. The effective profile of the thread-producing region is mapped onto the profile of the thread in the workpiece. Hence the thread profile also corresponds to the contour of a cross section of the thread turn perpendicular to its helical course, or of a longitudinal section through the thread in a plane of section that includes the central axis of the thread. Because the effective profile of the thread-producing region results from a two-dimensional rotational movement, for the third dimension, e.g. in the direction of the screw or cylinder axis of the thread, an appropriate helical movement of the tool is provided. Hence the tool preferably operates as a circular threading tool.

The resulting effective profile of each thread-producing region can be obtained by assembling the individual effective profiles of the thread-milling regions and the thread-forming regions in the thread-producing regions in various ways and in various order. Furthermore, the effective profiles of the thread-milling regions or the thread-forming regions of the thread-producing regions can differ from one another, so that together they form a composite effective profile, or else they can be identical to one another.

In one advantageous embodiment one subregion which is preferably central and/or projecting outward the furthest, of the overall effective profile of the thread-producing region is represented by the effective profile of the thread-forming region or regions, while adjacent subregions of the overall effective profile are represented by the thread-milling region (s). The thread thereby produced can have in particular a formed or grooved thread base and at least partially milled thread flanks. In this case the thread base is preferably formed over the entire depth of the thread, so that the texture of the workpiece material in this formed region is compressed and compacted to a comparatively high degree, which endows the thread with a high degree of stability and resistance to fracture. Because the machining of the workpiece in the other subregions involves removal of material, especially along the thread flanks, the flow of material into the thread core that would accompany an exclusively forming process is largely prevented. Therefore, the advantages of material-removing and material-conserving or -forming thread production are beneficially linked to one another.

Furthermore, the tool allows the profiles of the thread-milling and thread-forming regions to be very accurately adapted to one another. An entrance region with progressively increasing outer radius, such as is used in a conventional thread-rolling tap or thread-grooving tool or thread-milling cutter, is no longer required, although it can still be included as an extra feature. In addition, it is no longer necessary for the thread-grooving region to be inserted into an existing pathway.

In one advantageous embodiment at least one thread-producing region comprises at least one ridge (or: profile) that is radially oriented, i.e. projects outward, so as to run perpendicular to the tool axis with no inclination, and extends over at least part of the circumference and in particular can be separated or subdivided into partial ridges by partitioning channels. At each of the ridges or partial ridges at least one thread-forming region is constructed, in particular comprising structures that project further outward such as forming wedges or pressure lugs or thread-forming or -grooving teeth, and preferably there is also provided at the ridges at least one thread-milling region, in particular thread-milling tooth, which in particular are constructed by cutting away and/or profiling the ridges.

Not only one, but also several thread-producing regions can be provided, disposed one after another along the tool axis, so that in the presence of multiple thread-producing regions the number of turns through which the circular movement is carried out can be reduced.

In addition to the at least one thread-producing region, the tool can also comprise one or more regions that remove material for other purposes: in particular, in a first variant, in order to produce or prepare a surface of the workpiece for the thread and/or, in a second variant, to create a preliminary thread (or: raw thread) in the workpiece surface or one such surface, from which the desired thread can ultimately be produced. The geometries of the operating regions can in particular be chosen to be different, with regard to different functions or objectives such as, e.g., a smooth surface, a more stable construction or a polygonal shape or particular insertion depth.

With the first variant of such a tool it is possible to produce a thread even in a workpiece, the material of which is originally intact (full material), because the workpiece surface that the thread-producing region will need is created by the material-removing region, which itself removes the necessary material from the workpiece. Therefore previous machining of the workpiece, in particular previous drilling of a bore (core-hole drilling) in the case of an internal thread, is not necessary, although of course it is possible to include it as an extra operation. The material-removing region for preparation of the workpiece surface by cutting into it is preferably constructed as a drill, in particular one in which the cutting edge(s) continuously cut into or engage the workpiece material, but can also be constructed as a milling cutter, i.e. in particular one with discontinuous or interrupted cutting or with discontinuous engagement of the cutting edge(s) in the workpiece material. Analogously, in the second variant, in an advantageous embodiment the material-removing region for removing material in order to create the preliminary thread is a screw tap or thread driller, which thus operates in particular by continuous cutting, or in another embodiment is a thread-milling cutter, the cutting action of which is interrupted. The screw tap is employed primarily when a hole is bored all the way through the workpiece, and then can be outside this through-bore during the production of the circular thread.

The combination of these two variants offers in particular the possibility that a first material-removing region prepares the surface of the workpiece, in particular its wall sections, which in general are cylindrical, so as to provide an outer wall area for for an external thread or an inner wall area for an internal thread by the removal of material, after which a second material-removing region processes this surface prepared by the the first material-removing region so that the preliminary thread is incorporated into it, and finally this preliminary thread is additionally processed or finished by at least one thread-producing region.

The workpiece surface or the preliminary thread is either produced with the material-removing region in the same operational movement as the thread or finished thread, or else it is produced in a processing step that precedes the operational movement for producing the thread or finished thread; in the latter case, during the preceding processing step the tool is preferably moved forward into the workpiece in a substantially axial direction, while being rotated about its tool axis.

Furthermore, as the only or an additional material-removing region there can be provided a material-removing region adjacent to the thread-forming region, in the direction opposite to the direction of forward movement, in order to produce an entrance or opening region of the thread that is enlarged, in particular with respect to a thread core, and is in particular stepped or beveled.

In a further development the tool can also comprise at least one thread-forming region positioned after the thread-producing regions, for the purpose of subsequent processing and/or smoothing of the thread.

In one embodiment there is provided at least one additional material-removing region designed to move in a return direction opposite to the predetermined axial forward direction of the tool and oriented axially with respect to the tool axis, and/or to perform repeated cutting, or other material-removing treatment, of the thread core of the thread produced or subsequently processed by the thread-forming region, in particular for the purpose of reducing the thread core to the desired dimensions.

Preferably after the thread has been produced the tool is moved back in a return direction, which is opposite to the forward direction and in particular axially or helically; this movement serves to extract the tool from the workpiece or move it relative thereto in such a way that during the return movement preferably the or at least one material-removing region creates or adjusts an internal closure or the core of the thread, in particular carries away a part of the workpiece material that had flowed or been forced radially inward while the thread was being formed by the thread-forming region.

In particular, a thread with a complete number of thread turns is produced.

The velocity of the helical forward movement composed of the axial forward movement and the circular movement, and/or the return-movement velocity, is preferably adjusted according to the pitch of the thread.

The velocity of rotation of the tool about its own tool axis is preferably greater, by a factor in the range of 50 to 1000, than the rotational velocity of the circular movement of the tool axis or the tool.

In various embodiments it is possible for at least one thread-producing region to project radially outward from the tool axis either further or less far than at least one additional material-removing region, or to have either a larger or a smaller maximal radial outside diameter than at least one such region, in particular than at least one material-removing region disposed closer to the free end of the tool, in the forward direction, than the thread-producing region.

Material-removing region(s) and/or thread-producing region(s) and/or thread-forming region(s) can be made integral with the tool shaft or a tool head, or can also be connected to the tool shaft or head as prefabricated part(s); for example, they can be shrunk on, soldered or welded or glued on, or attached by screws or clamping. Furthermore, additional coatings to protect against wear and tear can be applied to the tool, or its operating regions. The tool can in particular comprise a carrier element or body, in particular a tool shaft or tool core, such that the or every thread-producing region and/or each additional material-removing region and/or each additional material-conserving region is/are constructed on or attached to the carrier element. At least one thread-forming region and/or at least one thread-milling region and/or at least one thread-producing region and/or at least one additional material-removing region can be constructed on a prefabricated part or made of a prefabricated part and each prefabricated part fastened to the carrier element by fixation means.

It is especially advantageous for the tool shaft to be made of a type of tool steel, in particular a rapid-machining steel. This can, for example, be a high-performance high-speed steel (HSS steel) or a cobalt-alloy HSS steel (HSS-E steel). The thread-producing regions are in general made of a material that is harder than the workpiece material and has sufficient toughness, preferably hard metal or a hard-metal alloy, in particular P-steel or K-steel or cermet, or else sintered hard metal, in particular tungsten carbide or titanium nitride or titanium carbide or titanium carbonitride or aluminium oxide, or else a ceramic cutting material, in particular polycrystalline boron nitride (PCBN) or polycrystalline diamond (PCD).

In an especially advantageous embodiment one or more channels or flutes are disposed at the circumference of at least one thread-producing region and/or at least one material-removing region, or else conduits are provided in the tool, in each case for the purpose of conducting a liquid medium, in particular a cooling and/or lubricating medium, in order to reduce friction and/or the development of heat and to transport away whatever heat is generated, and/or to transport away the chips of material that are produced (chip channels). The orientation of the channels or conduits can be straight and/or parallel or axial with respect to the tool axis and/or slanted with respect to the tool axis and/or they can run in the long direction of the tool, or they can also be twisted or follow a screw-shaped path around the tool axis (spiral flutes), i.e. are curved around the circumference of the tool or the tool axis.

These chip channels enable at least the cutting edge(s) of the or each material-removing region and/or the pressure lug(s) of the or each thread-forming region to be set back by way of the channel so as to be protected from damage or wear and tear caused by contact with the chips. Furthermore, separation channels can also be disposed or constructed between the thread-milling region and the thread-forming regions.

It is also possible for conduits to open into the channels and/or ahead of the thread-forming regions or cutting regions, in order to supply pressurized gas, in particular compressed air, in particular for the purpose of blowing chips away from the operating regions.

DESCRIPTION OF THE DRAWINGS

In the following the invention is explained in greater detail with reference to exemplary embodiments. Reference is also made to the attached schematic drawings, as follows:

FIG. 32-37 show the operational steps for producing a screw thread with a tool according to the invention, in chronological sequence, and FIG. 38 shows a tool with two milling strips and two forming strips.

Parts and quantities that correspond to one another are identified by the same reference symbols in FIG. 1 to FIG. 38.

Figure 1:
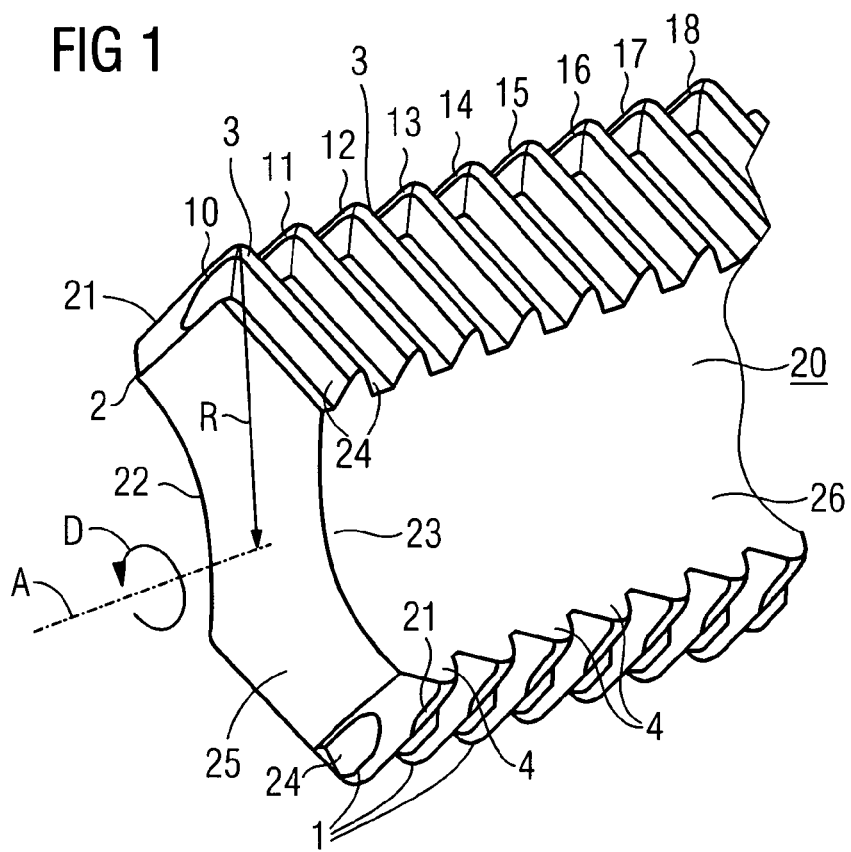
FIG. 1 shows a threading tool with two forming wedges and two milling cutters in perspective view.

The tool 20 according to FIG. 1 to 5 comprises a tool shaft 26 that can be rotated about a tool axis A, in particular a principal axis of inertia or eigen axis, which passes longitudinally through the centre of the tool shaft 26. The tool shaft 26 as a rule is substantially cylindrical, i.e. substantially circular in cross section, and while in operation is held or clamped at one end in a clamping device or tool holder or tool chuck (not shown) of a tool machine; this shaft-retaining means is coupled to at least one drive mechanism for driving or moving the tool. The tool shaft 26 can also, in addition to the circular cross-sectional outline, have other cross-sectional outlines as desired, including those that gradually increase or decrease in size and/or change their shape.

At the external circumference or outer surface of the tool shaft 26 are disposed straight operational regions or thread-producing regions 10 to 18, oriented parallel to one another and substantially perpendicular to the tool axis A, with no inclination. These regions 10 to 18 have outward-projecting ridges, each of which is subdivided into two subregions, e.g. the subregions 10A and 10B in FIG. 3, by oppositely oriented channels 22 and 23. The ridges in the thread-producing regions 10 to 18 are tooth-shaped in cross section in a region where, in the specified direction of rotation, the space between them opens into the associated channel 22 or 23, are cut sharply so as to form a tooth-like thread-milling edge, i.e. thread-milling tooth 4. The thread-producing regions 10 to 18 also comprise, approximately in the middle of each subregion, a thread-forming region or thread-forming tooth 1 and 3 that projects radially outward from the tool axis A to a greater extent than any other surface; that is, it is here that the tool 20 and its shaft 26 have the largest outside radius R.

In the region of the thread-forming teeth 1 and 3 the ridges in the thread-producing regions 10 to 18 have surfaces 24 on both sides that have been ground down in such a way that at the flanks of the thread-forming teeth 1 and 3 there is a tapering or a reduction of the cross section. To shape the head region of the thread-milling teeth 2 and 4 an additional ground surface 21 is provided at the outer region of the ridge, by means of which the originally rounded head regions or outer surfaces of the ridges in the thread-producing regions 10 to 18 are flattened.

Figure 6:
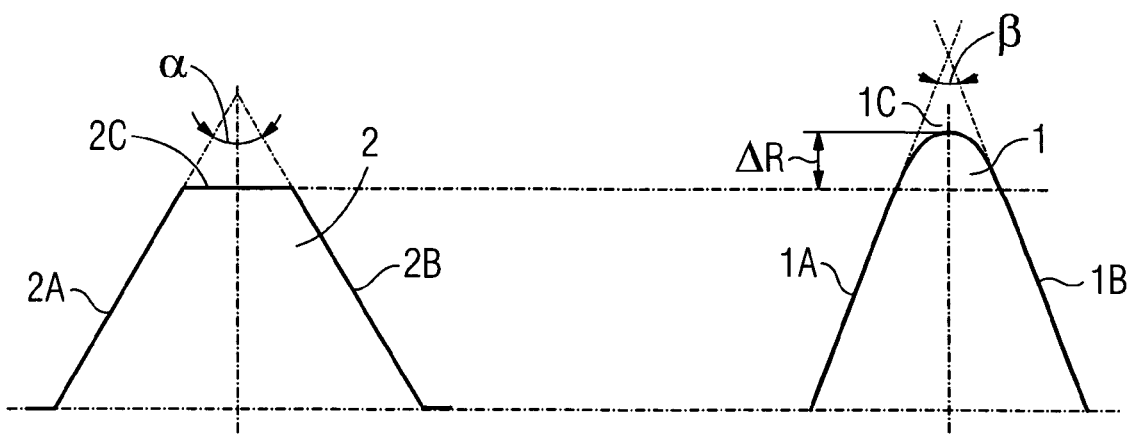
FIG. 6 shows a comparison of a thread-milling tooth and a thread-grooving tooth of the tool, in a cross-sectional representation.
Figure 7:
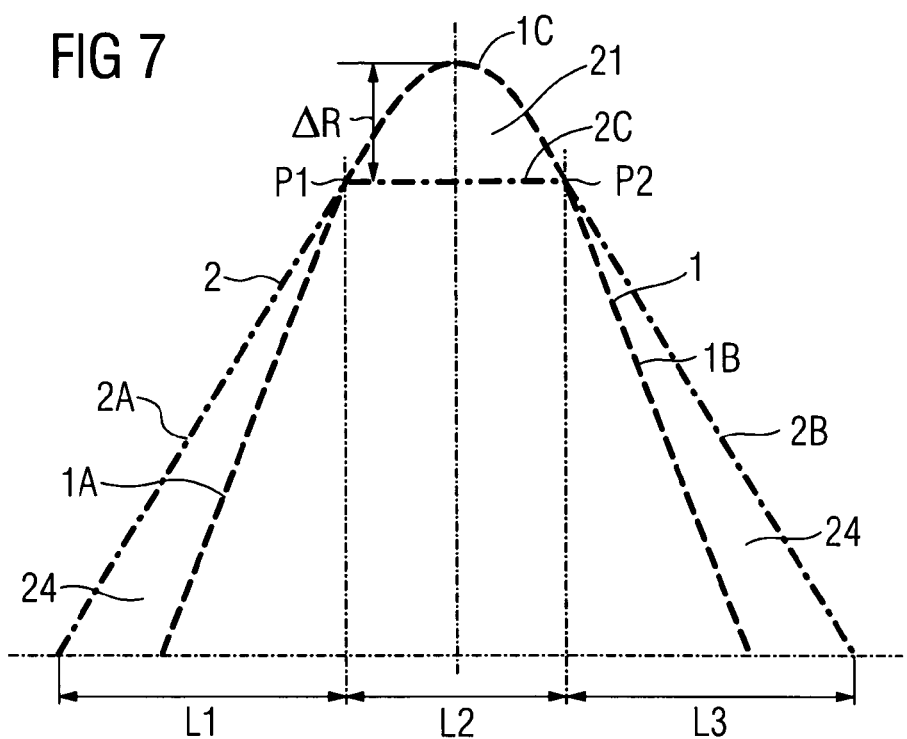
FIG. 7 shows a superposition of the two cross sections of thread-grooving tooth and thread-milling tooth according to FIG. 6.
Figure 8:
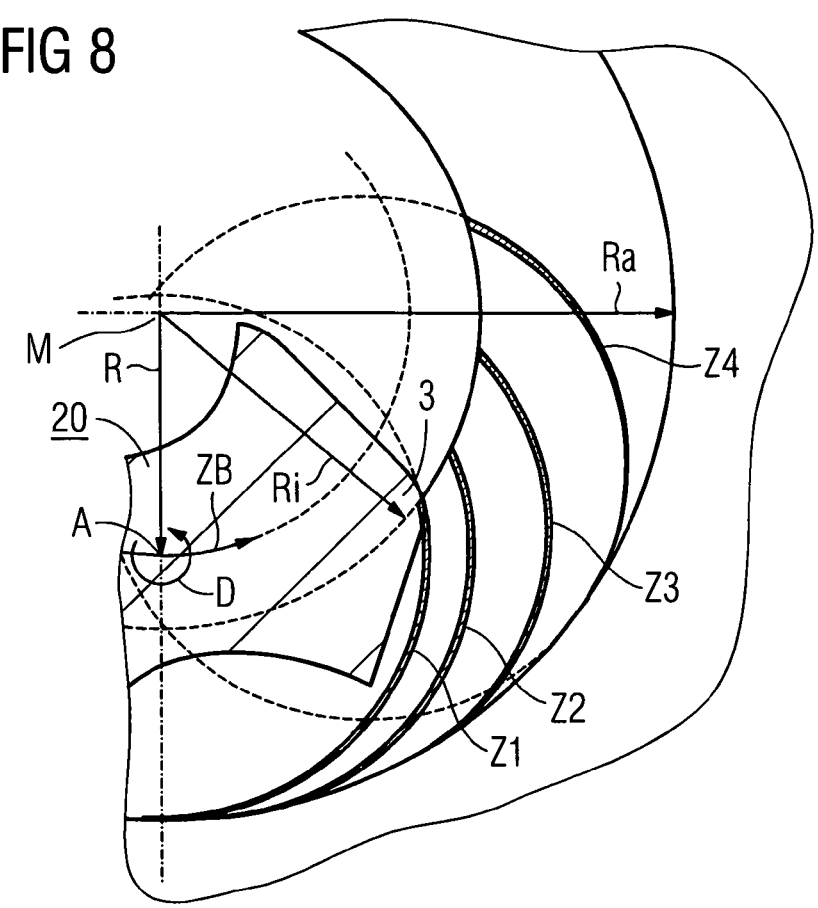
FIG. 8 illustrates the principles of operation of the tool while the thread is being produced in the workpiece.

As a result, the thread-forming teeth 1 and 3 have a larger radial dimension than the thread-milling teeth 2 and 4, while nevertheless having a smaller dimension in the axial direction with respect to the tool axis A, i.e. in their width. This can readily be discerned in the sectional illustrations of FIGS. 6 and 7, where the head region 1C of the thread-forming tooth 1 extends radially outward further, or has a greater height, than does the flat tooth head 2C of the thread-milling tooth 2, and the two flanks 2A and 2B of the thread-milling tooth 2 in turn each are spread further apart than are the flanks 1A and 1B of the thread-forming tooth 1. The radial difference between the tooth heads 1C and 2C is labelled ΔR.

The ground surfaces 21 and 24 are furthermore chosen to be such that the flanks 1A and 2A, as well as 1B and 2B, of the thread-forming tooth 1 and thread-milling tooth 2 intersect one another at the points P1 and P2, respectively; these intersection points also correspond to the transition points between the tooth head 2C and the two flanks 2A and 2B of the thread-milling tooth 2. Hence the tooth head 1C of the thread-forming tooth 1 extends radially outward beyond the entire tooth head 2C of the thread-milling tooth 2. The aperture angle α of the thread-milling tooth 2 is larger than the aperture angle β of the thread-forming tooth 1, which typically is about 50°.

As a consequence, the effective profile that results from superposition of the two teeth 1 and 2 of each of the thread-producing regions 10 to 18 is represented over the length L2, between the two intersection points P1 and P2 completely by the thread-forming tooth 1 and its tooth head 1C. At the flanks, in contrast, the tooth flanks 2A and 2B of the thread-milling tooth 2 constitute the effective operating surfaces of the thread-producing region 10 to 18. Therefore over the subregions covering the lengths L1 and L3, disposed on the left and right of the central subregion having the length L2, the effective profile is represented by these milling-tooth flanks 2A and 2B.

Figure 9:
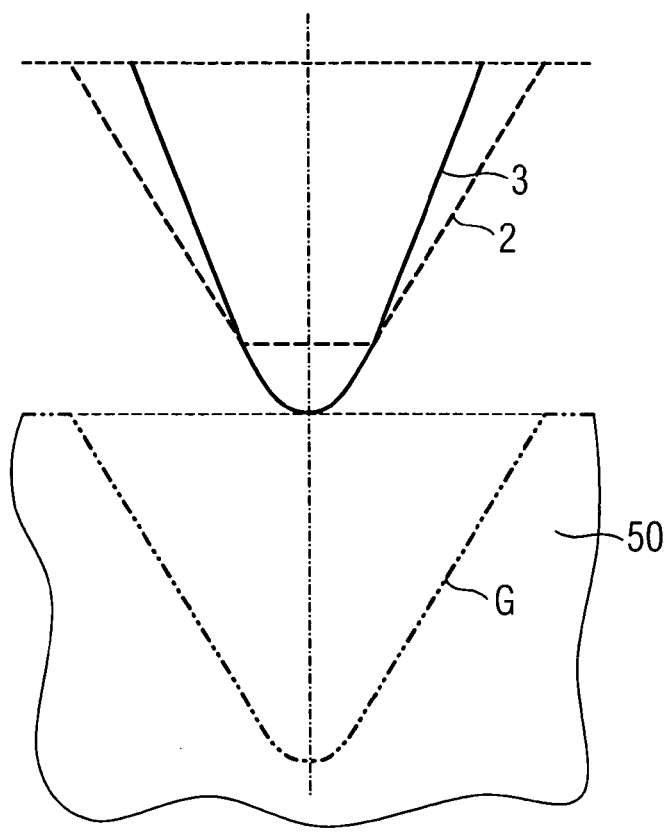
FIG. 9 shows the tool before insertion into the workpiece, in a sectional representation.
Figure 10:
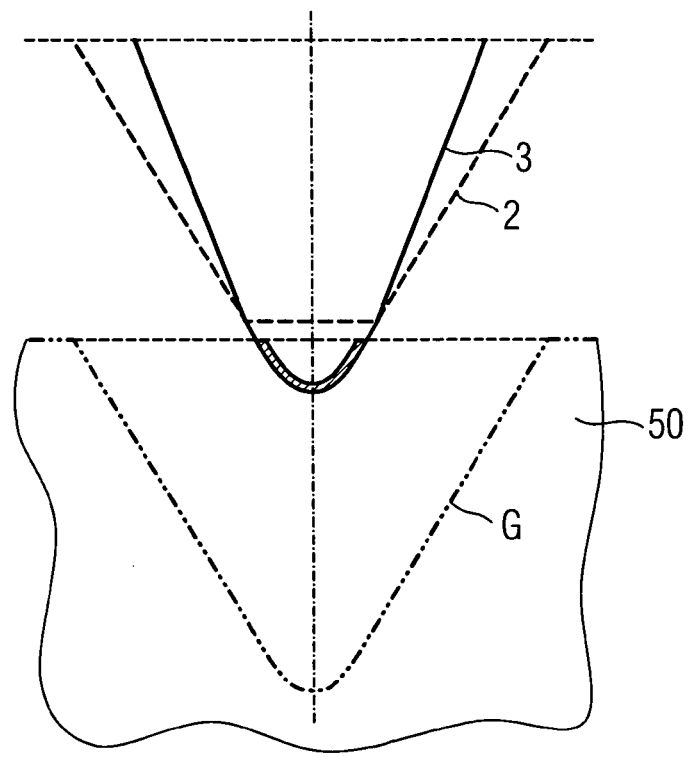
FIG. 10 shows the tool as it is being inserted into the workpiece.
Figure 11:
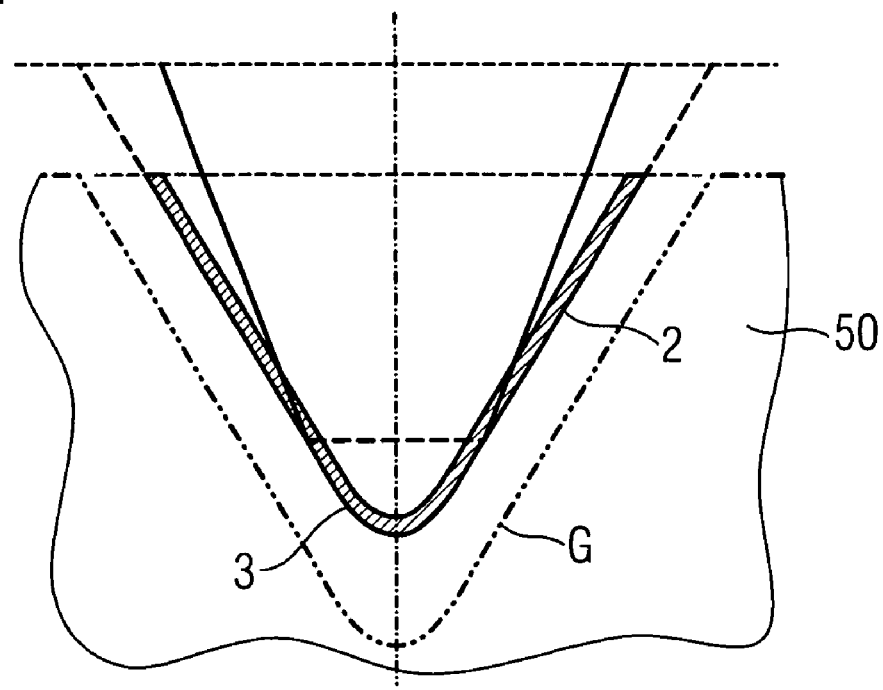
FIG. 11 shows the tool inserted further into the workpiece.
Figure 12:
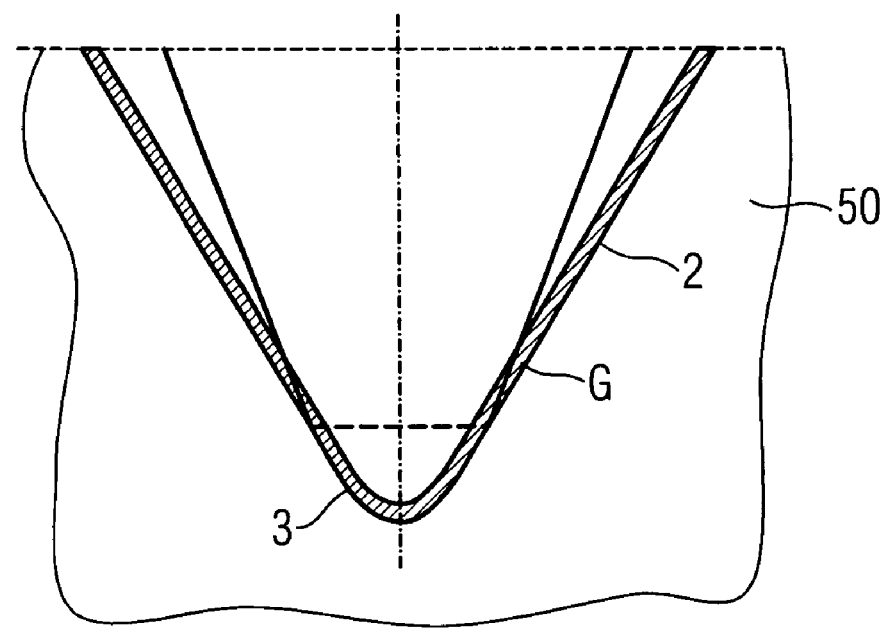
FIG. 12 shows the tool fully inserted into the workpiece.

FIGS. 8 to 12 illustrate the procedure by which the tool 20 operates during production of the thread G, with reference to four "snapshots" Z1 to Z4. The position Z1 in FIG. 8 corresponds to the position of the tool 20 with respect to the workpiece 50 as shown in FIG. 9, where the tool 20 and its thread-forming and thread-milling teeth have not yet come into engagement with the workpiece 50. The position Z2 in FIG. 8 corresponds to the radial section shown in FIG. 10, in which the effective grooving profile is already fully engaged with the workpiece 50. The position Z3 of the tool 20 in FIG. 8 corresponds in radial section to the drawing in FIG. 11, where the grooving profile is fully and the milling profile partly engaged. The position Z4 in FIG. 8 in radial section corresponds to the situation in FIG. 12, in which both grooving profile and milling profile are fully engaged; that is, the entire tool is completely or maximally engaged with the workpiece 50 and hence the effective profile of the tool coincides with the nominal profile of the thread G, which is indicated by the dot-dash line.

The tool 20 is indicated in a momentary position relative to the workpiece 50, to assist understanding. The tool axis A is directed perpendicular to the plane of the drawing. The tool 20 turns, in its own rotation, in the direction D about its tool axis A, and is simultaneously moved in a circular movement ZB about the central axis M of the thread G with its tool axis A parallel to the central axis M. Finally, the tool 20 is also moved downward, perpendicular to the plane of the drawing in FIG. 8, in an axial forward movement VB parallel to the tool axis A. The result is a helical forward movement of the tool along a screw-like path, which results from the superposition of the circular movement ZB and the linear forward movement VB. The forward velocity and forward direction of the tool relative to the workpiece are thus oriented tangential to this screw path or helix.

The tool 20 is driven about its own tool axis A in the rotational direction D with a rotational velocity, or revolutions per minute, very much greater than the rotational velocity of the circular movement ZB about the central axis M. The ratio of the velocity of the rotation about its own tool axis A and that of the circular movement ZB about the central axis M is typically in a range between 50 and 1000. As a result, the thread-forming teeth 1 and 3 and thread-milling teeth 2 and 4 disposed one after another along the circumference engage the workpiece 50 in rapid succession, thereby together producing the turns of the thread G. The inside radius or core radius of the thread G is identified by the symbol Ri and the outside radius of the thread G, by Ra.

Figure 13:
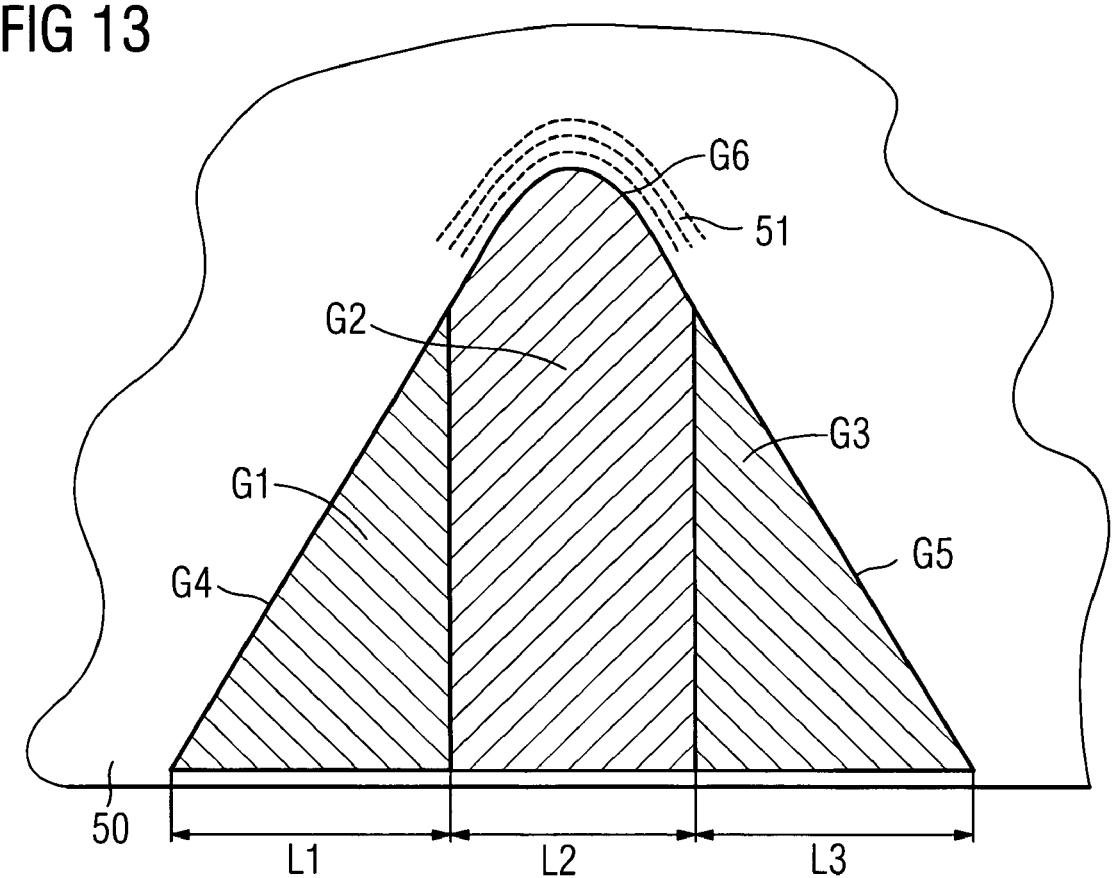
FIG. 13 shows a longitudinal section through part of the thread produced in the workpiece.

FIG. 13 shows the finished thread produced with this tool in a section corresponding to one thread turn, in longitudinal section axial with respect to the tool axis. The thread profile resulting from the circular movement of the tool according to FIG. 8 to 12, which is superimposed on the effective profile of the thread-forming teeth 1 and 3 as well as the thread-milling teeth 2 and 4 of the tool according to FIG. 1 to 7, is represented by the example of one thread turn. The middle thread region G2, cross-hatched in one direction, has the length L2 and is produced exclusively by the thread-forming teeth 1 and 3. The two outer thread regions G1 and G3 have the lengths L1 and L3, which are typically equal (L1=L3) and are milled, i.e. are produced with the thread-milling teeth 2 and 4. The thread flanks G4 and G5 of the thread are thus cut or milled, whereas the base or head G6 of the thread is produced by deformation, with no removal of material. In a region 51 of the workpiece 50 that surrounds the formed thread base G6, the material of the workpiece 50 is therefore compressed and compacted, and the probability of fissures or breaks in the thread base is thereby distictly reduced.

FIG. 14 to 22 now show a tool for creating a spherical thread. This embodiment differs from the embodiment of the tool according to FIG. 1 to FIG. 7 in that the thread profile to be produced in the workpiece is more curved in the present case, which is achieved by correspondingly curved profiles of the thread-milling and thread-grooving teeth. The basic construction of the tool is comparatively similar to that in FIG. 1 to FIG. 7.

Figure 2:
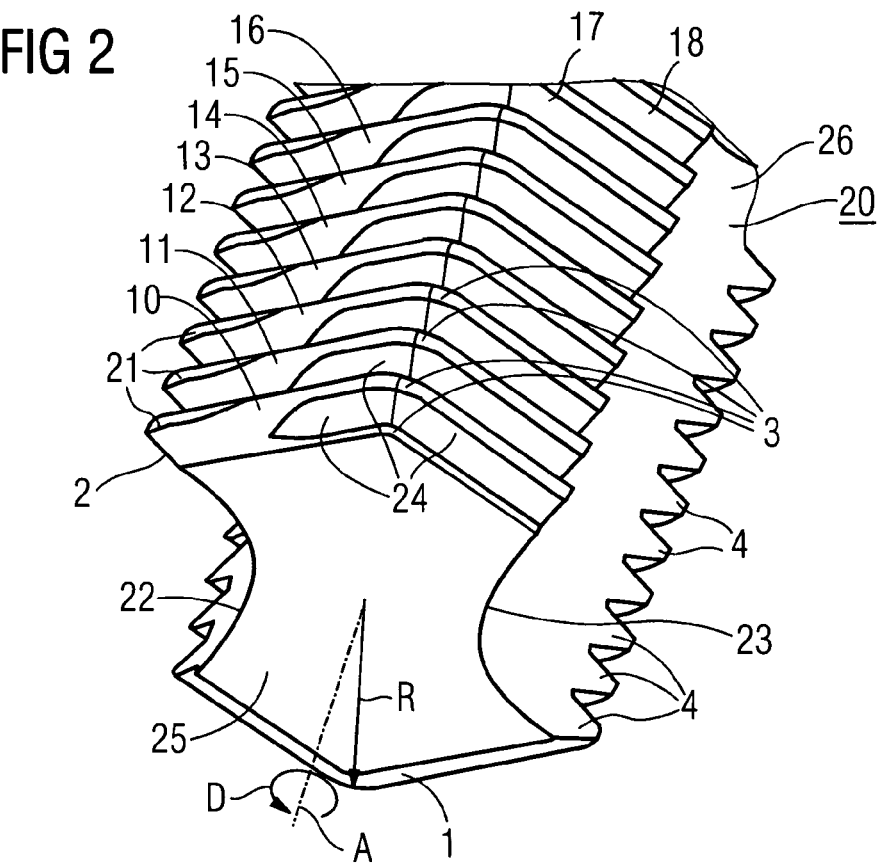
FIG. 2 shows the tool according to FIG. 1 in a perspective view that has been rotated slightly forward.
Figure 3:
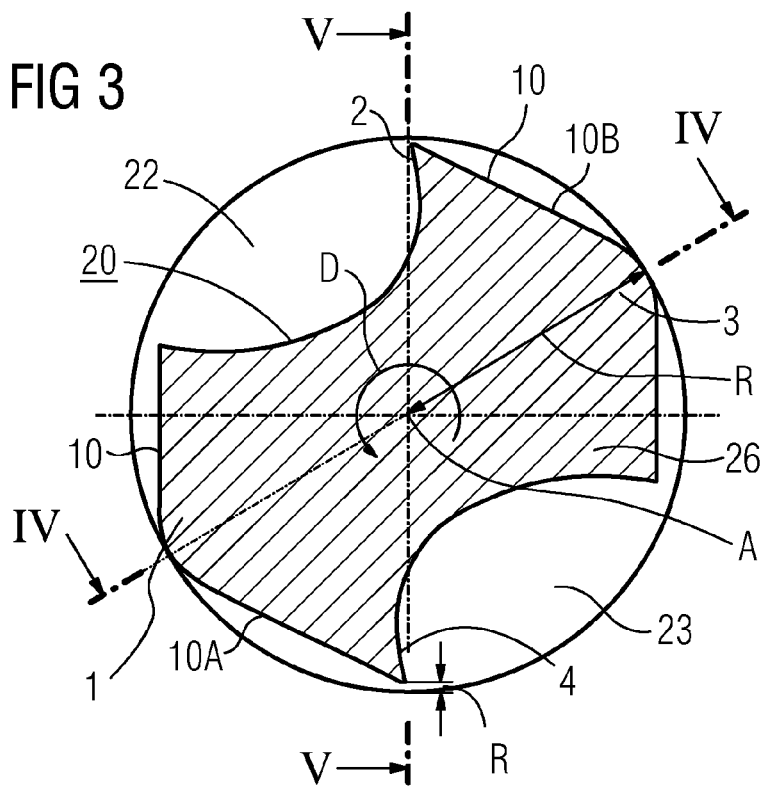
FIG. 3 shows a cross section of the tool according to FIG. 1 and FIG. 2.
Figure 4:
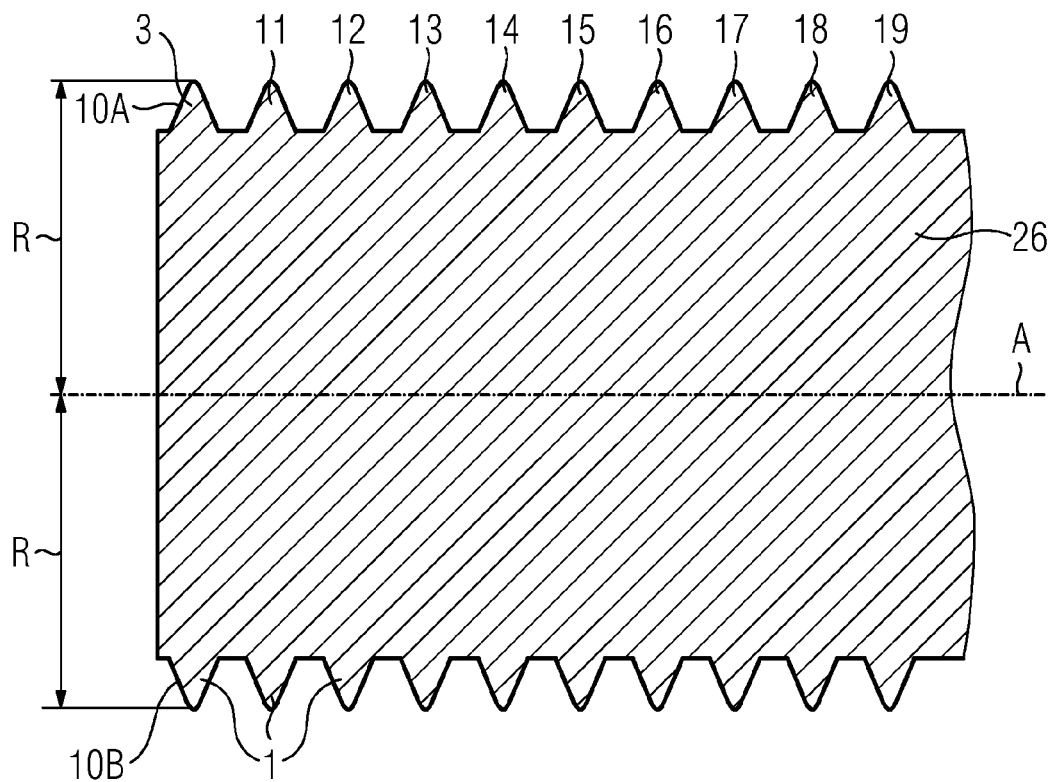
FIG. 4 shows a longitudinal section through the tool according to FIG. 1 to FIG. 3, in the region containing the thread-forming parts.
Figure 5:
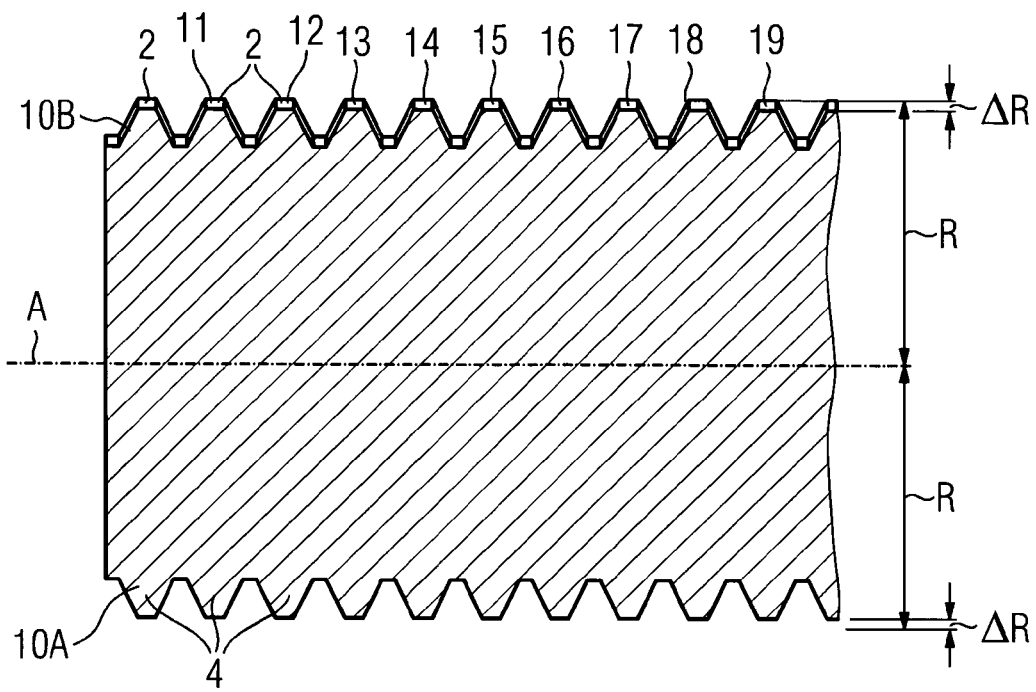
FIG. 5 shows a longitudinal section through the tool according to FIG. 1 to FIG. 4 in the region containing the thread-milling teeth.
Figure 14:
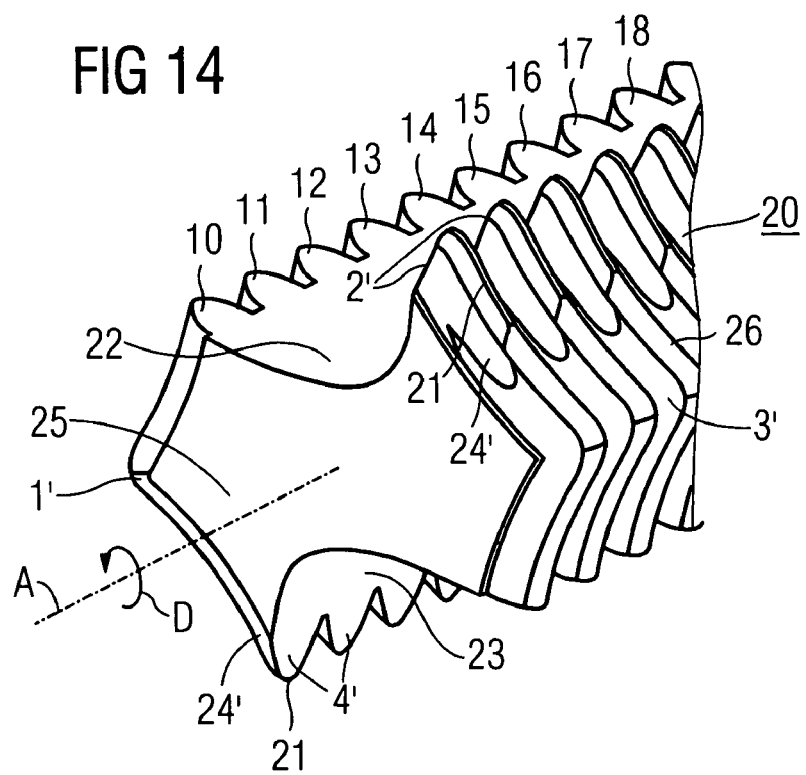
FIG. 14 is a perspective view of a tool for producing a spherical thread.
Figure 15:
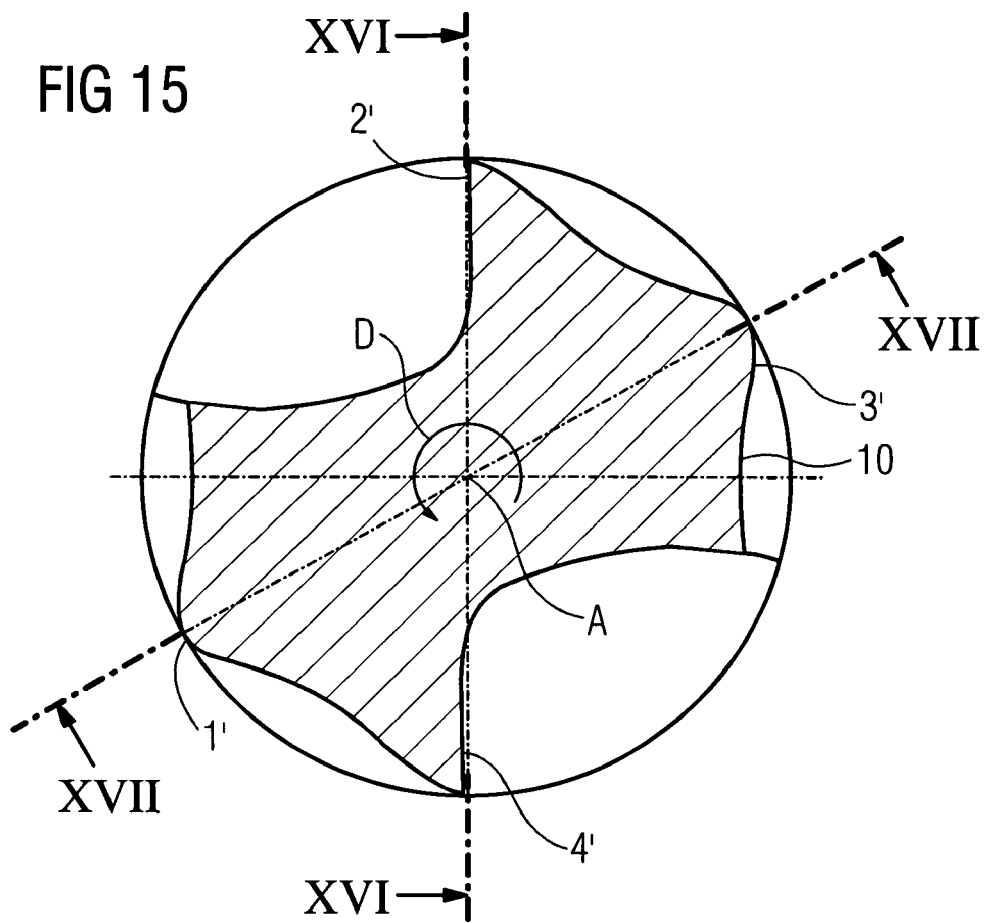
FIG. 15 shows the tool according to FIG. 14 in cross section.
Figure 16:
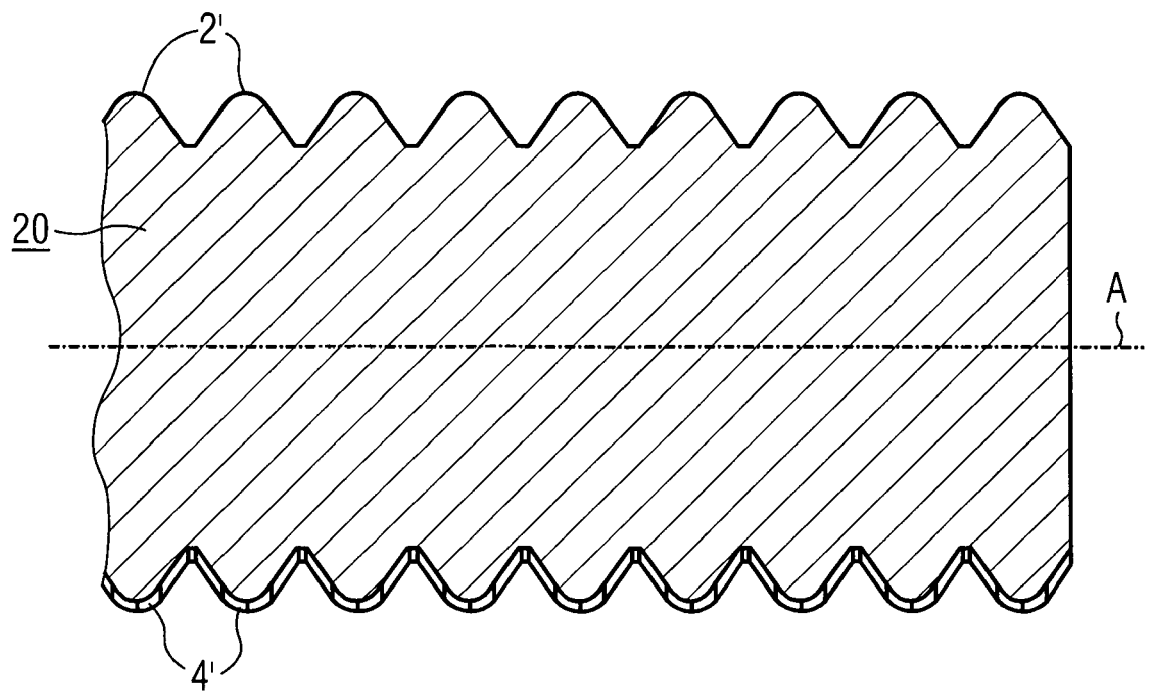
FIG. 16 shows the tool according to FIG. 14 and FIG. 15 in longitudinal section.
Figure 17:
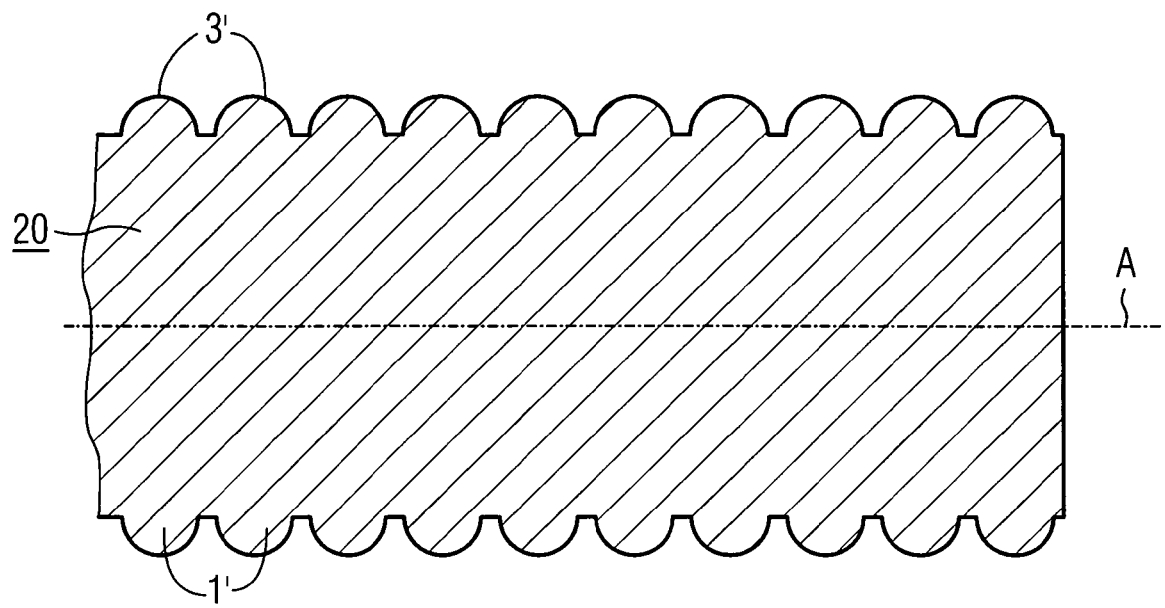
FIG. 17 shows the tool according to FIG. 14 to FIG. 16 in longitudinal section after rotation by 90°.

In the embodiment according to FIG. 14, as in FIGS. 1 and 2, straight chip channels 22 and 23 are produced in the shaft 26 of the tool 20, which subdivide the individual ridges of the thread-producing regions 10 to 18 into two subregions. Here again, on one side of the grooves 22 and 23 the ridges of the thread-producing regions 10 to 18 form thread-milling teeth 2' and 4', which on one hand have a cross section that is laterally reduced by ground surfaces 24', in comparison to the original rounded configuration, and on the other hand at the head of the tooth are likewise reduced in their radial extent by a ground surface 21; furthermore, owing to the ground surfaces 21 and 24', the rounded shape is modified to an approximately polygonal shape so as to form at least approximately straight cutting edges. In the region of the ridges where the surfaces have not been ground down, at the outermost regions of the thread-producing regions 10 to 18, i.e. those with the largest outside radius R, thread-forming teeth 1' and 3' are again disposed. The ridges run to the thread-forming teeth 1' and 3' with a convex curvature, in contrast to FIG. 1 to 4, where the ridges are approximately straight.

As in the case of the tool according to FIG. 1 to FIG. 7, the tool according to FIG. 13 to FIG. 17 has a two-fold rotational symmetry; that is, when rotated by 180° and 360° in each case it is congruent, i.e. coincides with itself. It is of course also possible in general for there to be an n-fold symmetry, where n is a natural number.

Figure 18:
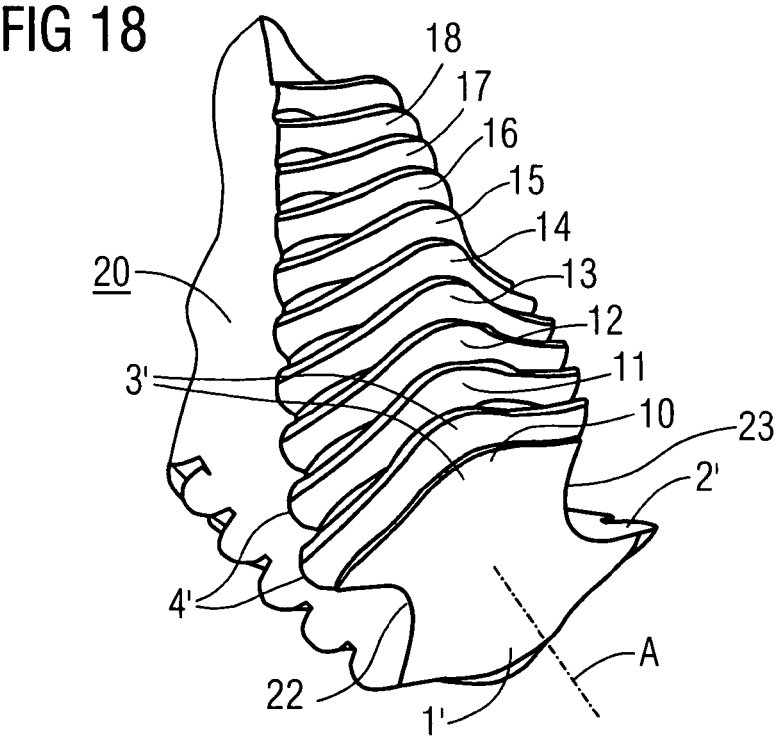
FIG. 18 is a perspective view of a tool similar to that in FIG. 14 to 17, except that it contains twisted channels.

In FIG. 18 a tool for producing spherical threads is shown in which, in contrast to FIG. 14, the chip channels as well as the thread-forming teeth and thread-milling teeth of different thread-producing regions are disposed in a twisted arrangement; that is, they do not run parallel to the tool axis A but rather at an angle to the tool axis A or with a spiral or helical rotation or twist about the tool axis A. The thread-forming teeth 1' and 3' as well as the thread-milling teeth 2' and 4' of adjacent thread-producing regions—e.g., 10 and 11 or 11 and 12, etc.—are thus each offset from one another in the circumferential direction.

Figure 19:
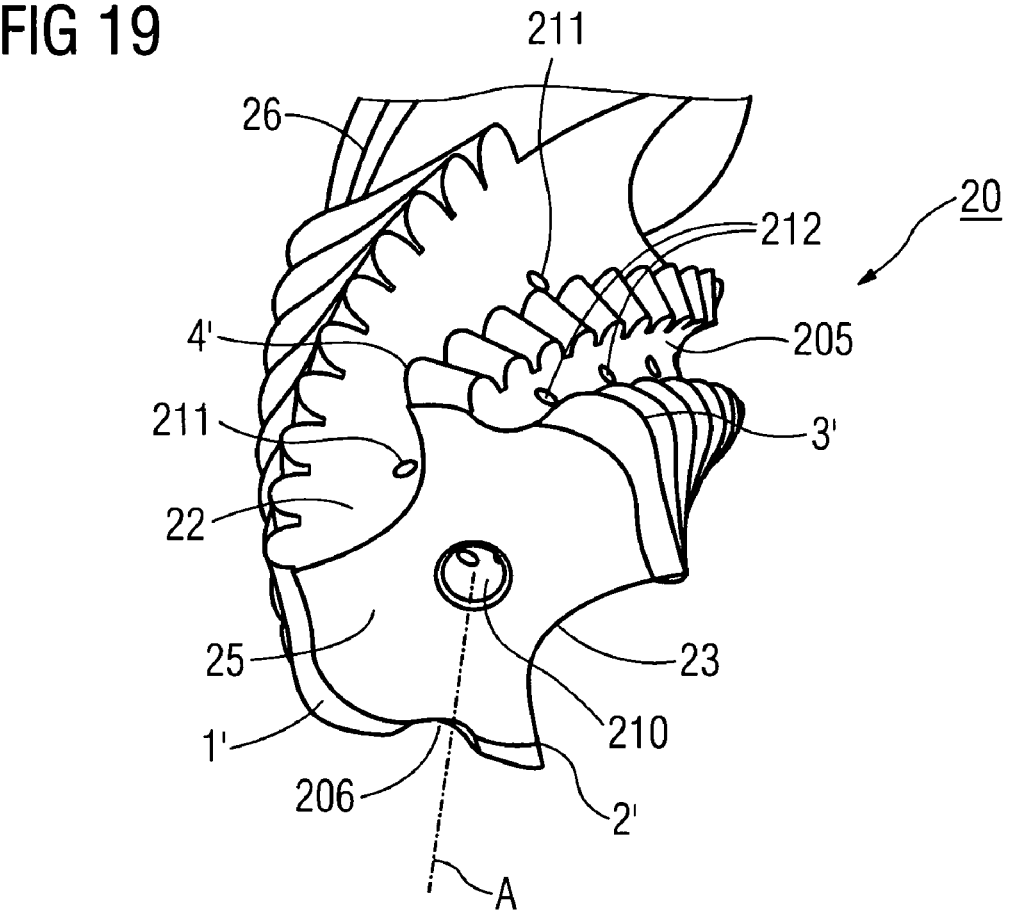
FIG. 19 shows a tool according to FIG. 18 with additional separation channels between milling teeth and forming teeth, in a somewhat rotated perspective view.

FIG. 19 shows a tool that departs from the embodiment according to FIG. 18 in that twisted separation channels are additionally provided to relieve the load on the thread-forming teeth: a separation channel 205 between the thread-milling teeth 4' and the thread-forming teeth 3', and a channel 206 between the thread-milling teeth 2' and the thread-forming teeth 1'. By way of internal conduits 212 that open into these separation channels 205 and 206 a fluid medium, in particular an oil-water emulsion and/or compressed air, is provided for cooling and/or lubrication and/or removal of chips from the channels. For the same purpose outlets of internal conduits 211 are preferably also provided in the chip channels 22 and 23, and/or there is a central outlet of a central conduit 210 at the end face 25.

Figure 20:
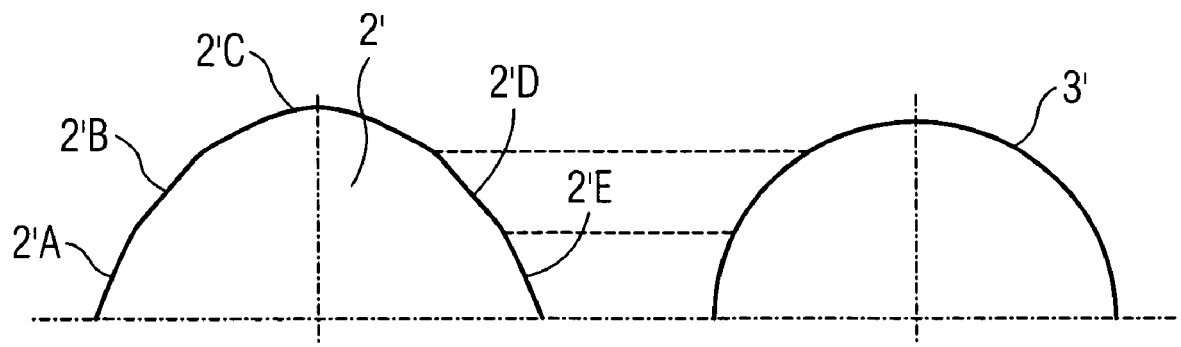
FIG. 20 shows a comparison between thread-milling tooth and thread-grooving tooth of a tool according to FIG. 14 to 19.
Figure 21:
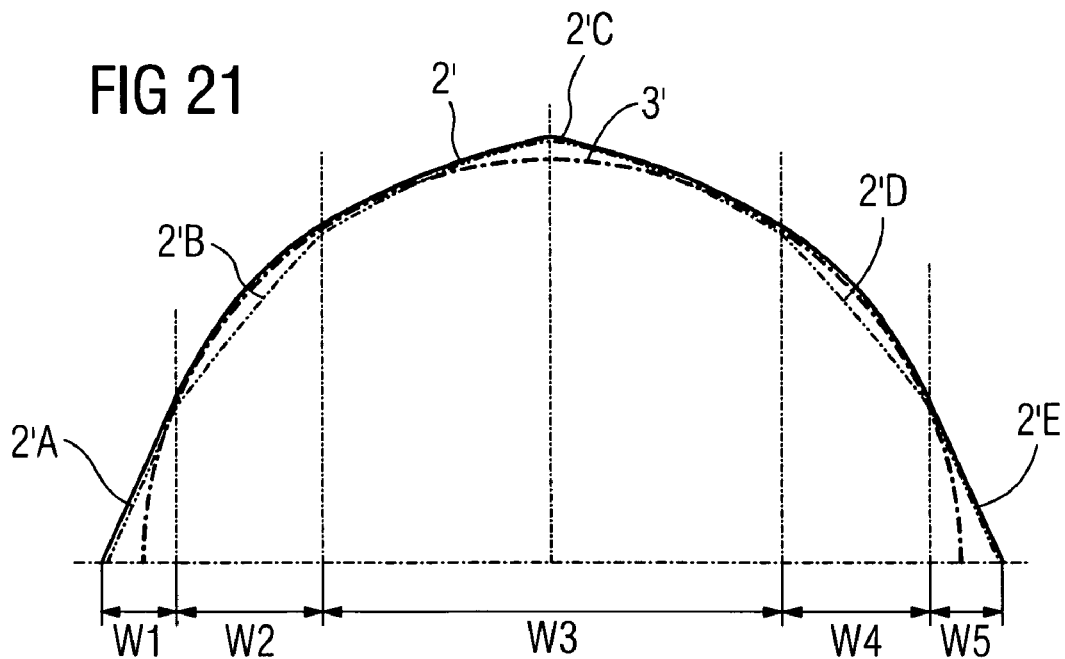
FIG. 21 shows the superposition of the profiles of a thread-milling tooth and thread-grooving tooth according to FIG. 20.

The thread-forming teeth 1' and 3' as well as the thread-milling teeth 2' and 4' have in particular the tooth profile illustrated in FIG. 20 with reference to the thread-milling tooth 2' and the thread-forming tooth 3'; in FIG. 21 these two profiles are shown superimposed to produce an effective profile. The thread-milling tooth 2' comprises a central head region 2'C and two outer flank regions 2'A and 2'E as well as, disposed between each of the latter and the central region, inward-slanting flank regions 2'B and 2'D. The thread-forming tooth 3' has a substantially circular outline.

The effective profile of each thread-producing region 10 to 18 is again generated by the rotational superposition of the profiles of the milling teeth 2' and 4' and forming teeth 1' and 3'. The effective profile is composed of two outer effective-profile regions having axial lengths W1 and W5, in which the profile of the thread-milling tooth 2' projects further outward and hence is the effective profile, plus the two medially adjacent effective-profile regions having axial lengths W2 and W4, in which the grooving profile of the thread-forming tooth 3' extends further outward and hence is the effective profile, plus a middle effective-profile region having the length W3, in which again the thread-milling tooth 2' constitutes or represents the effective profile.

Figure 22:
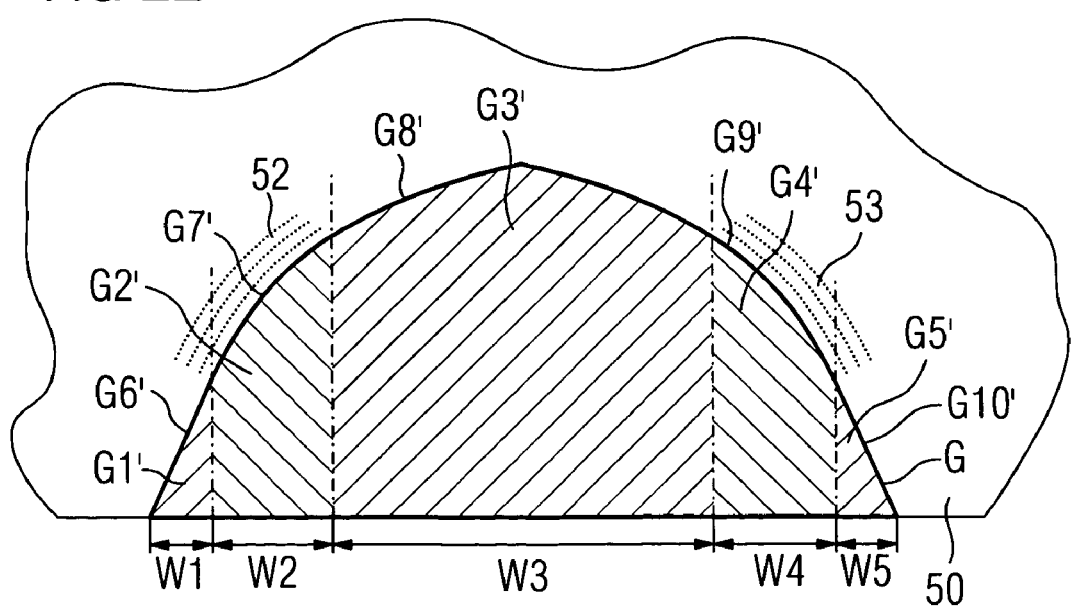
FIG. 22 shows a longitudinal section through part of the thread produced with the profiles according to FIGS. 20 and 21.

The result of thread production with the threading tool according to FIG. 15 to FIG. 21, employing a circular movement, is shown in FIG. 22 for a longitudinal section of a thread turn. The effective profile is reflected in the workpiece 50 by correspondingly milled or grooved thread regions and thread-profile regions.

The entire thread profile G' in the workpiece 50 thus comprises two outer flank regions G6' and G10', which are produced by milling with a milling tooth and accordingly have the lengths W1 and W5, respectively. The milled regions are denoted by cross-hatching from lower left to upper right, and the formed or grooved regions, by cross-hatching from upper left to lower right; the final thread-profile surfaces that have been cut or milled are indicated by a solid line and the formed profile surfaces, by a dot-dash line. The milled parts are the thread-profile regions G6' and G10', in front of which the open spaces G1' and G5' have been cut away over the lengths W1 and W5, respectively, and the middle thread-profile region G8' with the underlying cut-away region G3', over the length W3. The parts that have been exclusively formed, in contrast, are the thread-profile regions G7' and G9' with the underlying formed open regions G2' and G4', over the lengths W2 and W4, respectively. The lengths W1 and W5 can be the same as or different from one another, as can the lengths W2 and W4.

Figure 23:
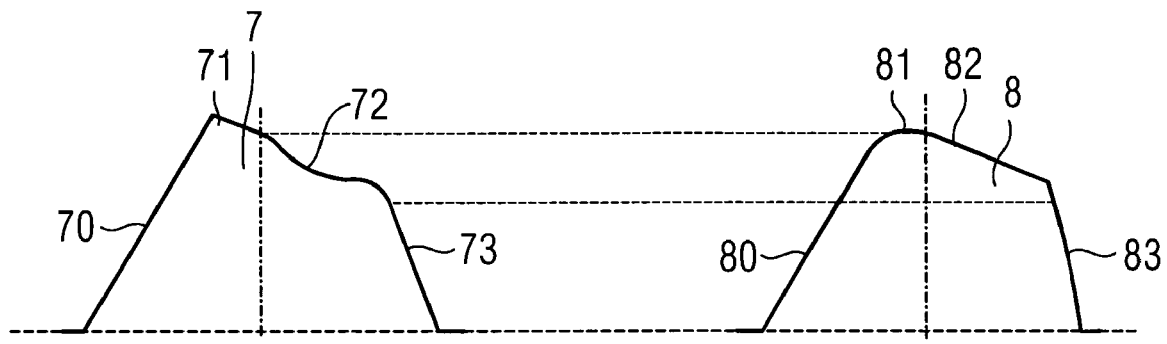
FIG. 23 shows a comparison between thread-milling tooth and thread-grooving tooth with a special, asymmetrical configuration.
Figure 24:
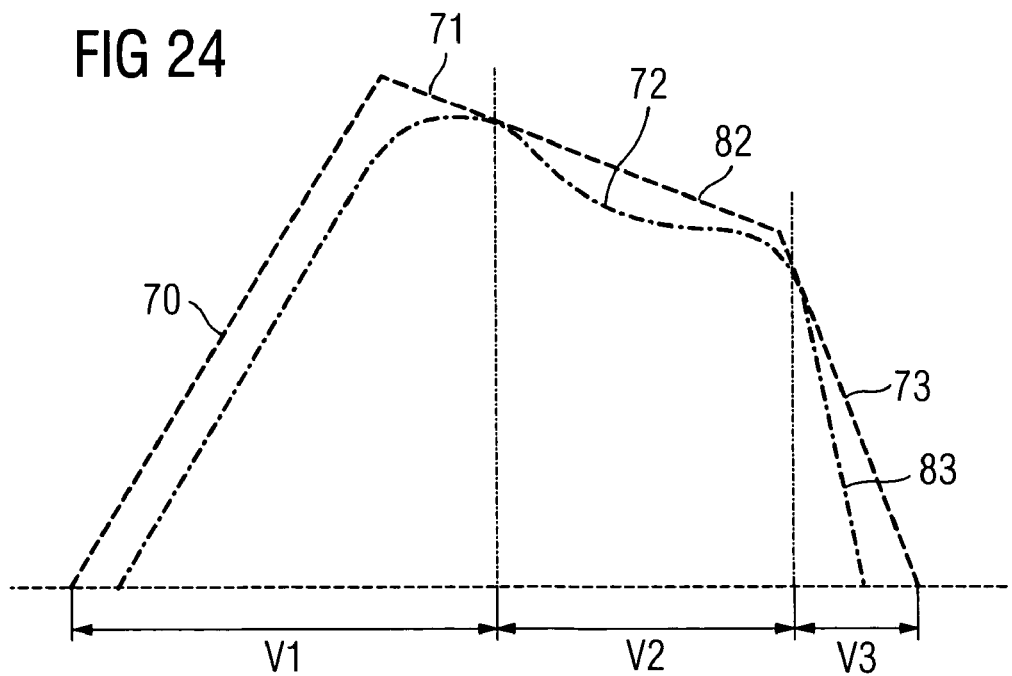
FIG. 24 shows the superposition of the two profiles of the two teeth according to FIG. 23.
Figure 25:
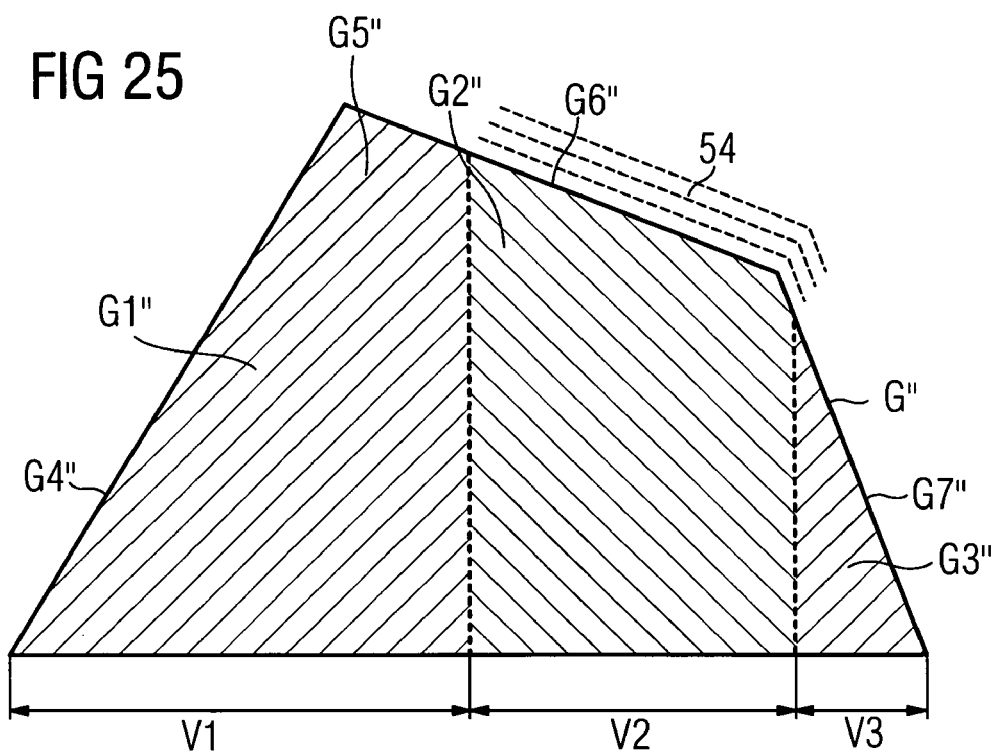
FIG. 25 shows a longitudinal section through part of the thread produced with the two teeth according to FIG. 23 and FIG. 24.

FIGS. 23 to 25 show a special profile with an asymmetrical configuration, which for example is suitable for producing a self-lock thread according to *EMUGE-Handbuch*, page 294.

FIG. 23 shows, side by side, a thread-milling tooth and a thread-forming tooth, the superimposed or composite effective profile of which is illustrated in FIG. 24. The resulting effective profile according to FIG. 24 is composed of the profile regions 70 and 71 of the thread-milling tooth 7 and the forming regions 82 and 83 of the thread-forming tooth 8. The remaining profile regions 72 and 73 of the thread-milling tooth as well as 80 and 81 of the thread-forming tooth 8 remain ineffective because they do not extend so far outward. The length of the left effective milling profile comprising the milling-profile regions 70 and 71 is indicated by V1, and that of the right thread-milling profile region 73, by V3, while the length of the effective forming profile 82 is labelled V2. The effective profile according to FIG. 24 is again generated by rotational superposition of the two profiles of milling tooth 7 and grooving tooth 8, and is composed of the effective outer regions 70, 71, 73 and 82 of whichever profile extends further out in that position.

Now FIG. 25 shows the correspondingly produced thread G" in the workpiece 50, in longitudinal section. The thread G" is composed of a milled-out thread region G1", which is delimited from the workpiece 50 on the left by a partial thread profile G4", which forms a thread flank, and by a partial thread profile G5" at an angle to this partial profile G4", being inclined downward. On the right flank a milled partial thread profile G7" is likewise produced, which bounds a milled-out thread region G3". Between these two milled thread regions with lengths V1 and V3 is a central, shaped thread region G2", which is delimited from the workpiece 50 by the partial thread profile G6", produced by forming with no removal of material. Accordingly, the material of the workpiece adjacent to the partial thread profile G6" is compressed or compacted, in a region 54. This compacted region 54 results from deformation over the entire height of the thread, i.e. the processing depth, from the thread base to the partial thread profile G6", because the whole region G2" is formed and not, for instance, partially cut out in advance by one of the milling teeth. As a result of this compaction, an especially high elastic restoring force is obtained to keep the wedge-shaped surface of the screw or threaded bolt securely in contact with this slanted partial thread profile G6".

Figure 26:
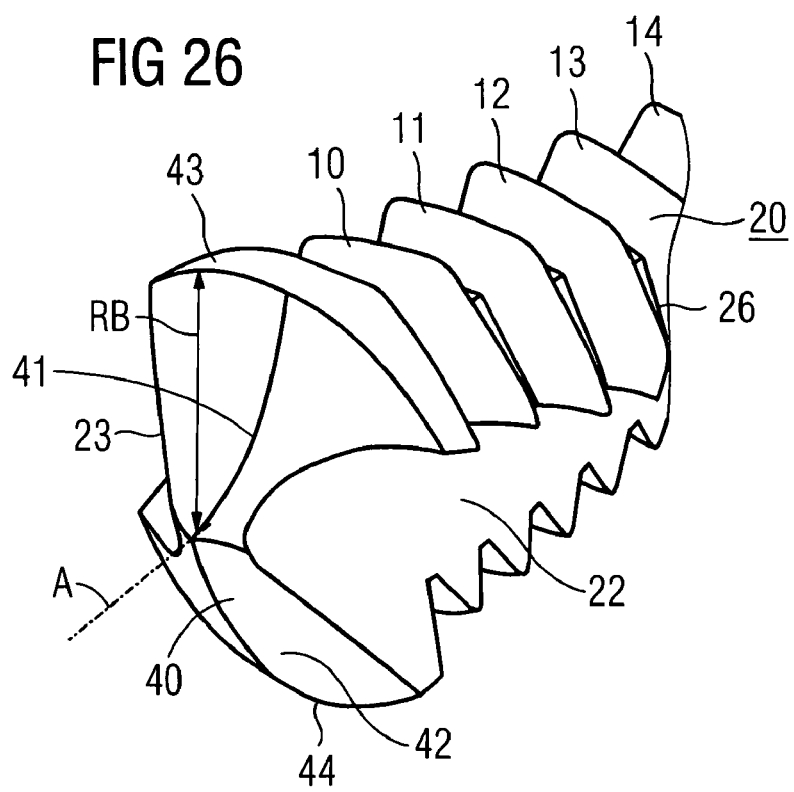
FIG. 26 is a perspective view of a tool with an additional axial drill part.

FIG. 26 shows a combined tool constructed as follows: beginning with a tool according to FIGS. 1 and 2, first the tool is twisted in that the grooves 22 and 23 are constructed in a twisted shape and also the thread-producing regions 10 to 15 between them, as well as the additional thread-producing regions not shown here and their thread-forming teeth 1 and 3 and thread-milling teeth 2 and 4, likewise run along a twisted course.

Furthermore, at the end face or free end of the tool a drill tip 40 is constructed, with drilling edges 41 and 42 on the face itself and drilling edges 43 and 44 at the circumference. The channels 22 and 23 run as far as the drill tip 40, so that they can conduct away the chips of material that are cut loose during drilling. With the tool illustrated in FIG. 26 the first step is to create an initial bore for an internal thread by means of an axial forward movement combined with rotation of the tool 20 in the direction of rotation determined by the arrangement of the drilling edges 41 and 42 of the drill part 40; in the exemplary embodiment according to FIG. 26 this direction of rotation is clockwise, i.e. to the right, about the tool axis A. Accordingly, the drilling edges project radially further outward than do the thread-producing regions 10 to 14. The outside radius RB of the drill part 40 is therefore larger than the outside radius R of the thread-producing regions 10 to 14. As a result, the core diameter or inside diameter of the bore produced by the drill part 40 is larger than the outside diameter of the thread-producing region of the tool 20. After the bore has been produced by the axial drilling movement into the workpiece, the tool 20 is now shifted radially with respect to the tool axis A, toward the inside wall of the bore produced in the workpiece, and with the thread-producing regions 10 to 14 the thread is produced as described above, by circular forming and circular milling. In the case of a bore that does not pass all the way through the workpiece (a pocket hole), during this shifting movement the drill part with its circumferential drilling edges 43, 44 produces an end or terminal region of the thread that extends further radially outward than the remainder, whereas in the case of a through-bore or through-opening the drill part can also already be outside the workpiece while the thread is being produced.

Figure 27:
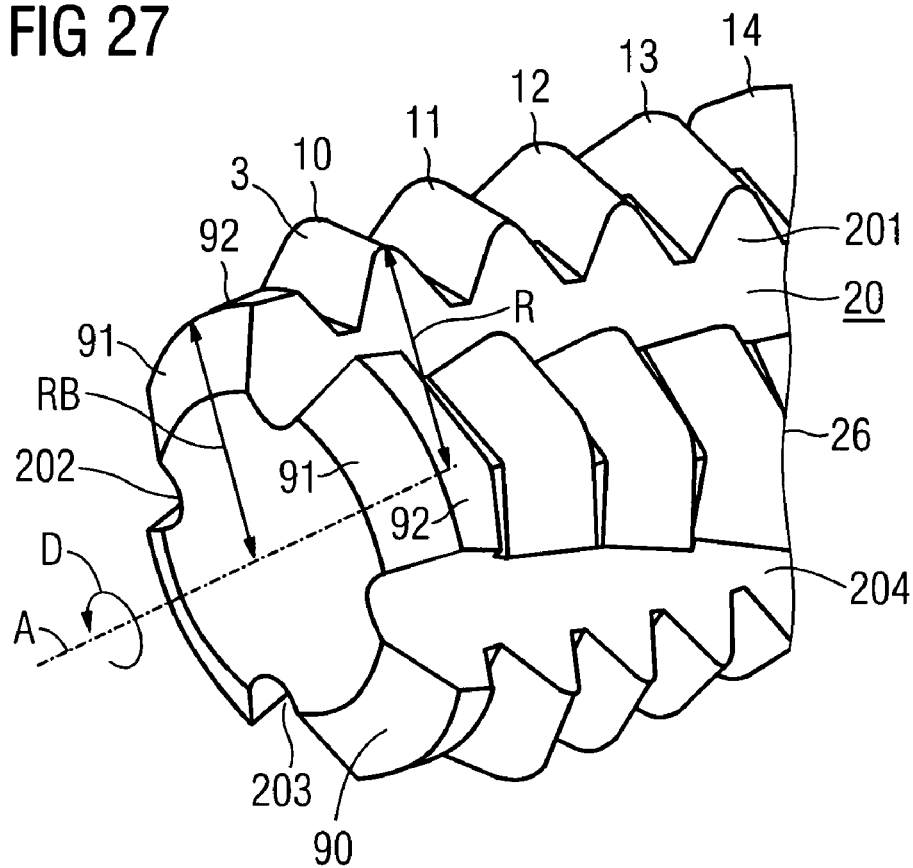
FIG. 27 shows a tool in accordance with the invention with an additional circular drill part.

FIG. 27 now shows a combined drilling and thread-producing tool, with which during a single operational movement or a single operational step according to the circular procedure both the bore and the internal thread in the bore can be produced in the previously intact or full material of the workpiece. For this purpose the combined tool 20 comprises a drill part 90, disposed at the front end, that is subdivided into four subregions by four chip channels 201 to 204, which run as far as the end face 25 of the tool 20 and open there; within each subregion an end-facing drilling edge 91 and a circumferential drilling edge 92 are disposed. The outside radius RB of the drill part 90 in this case is smaller than the outside radius R of the thread-producing region, because the thread-forming teeth and thread-grooving teeth of the thread-producing regions must still incorporate the thread into the workpiece with the same movement that is used for preparation of the workpiece surface by the drill part 90, and therefore sufficient material must remain, or a sufficient outside diameter of the material. The four chip channels 201 to 204 also separate the thread-producing regions, of which those designated 10 to 14 are shown, so that each of the thread-producing regions 10 to 14 comprises four (not individually identified) thread-forming teeth and four thread-milling teeth, in particular with a four-fold rotational symmetry.

Figure 28:
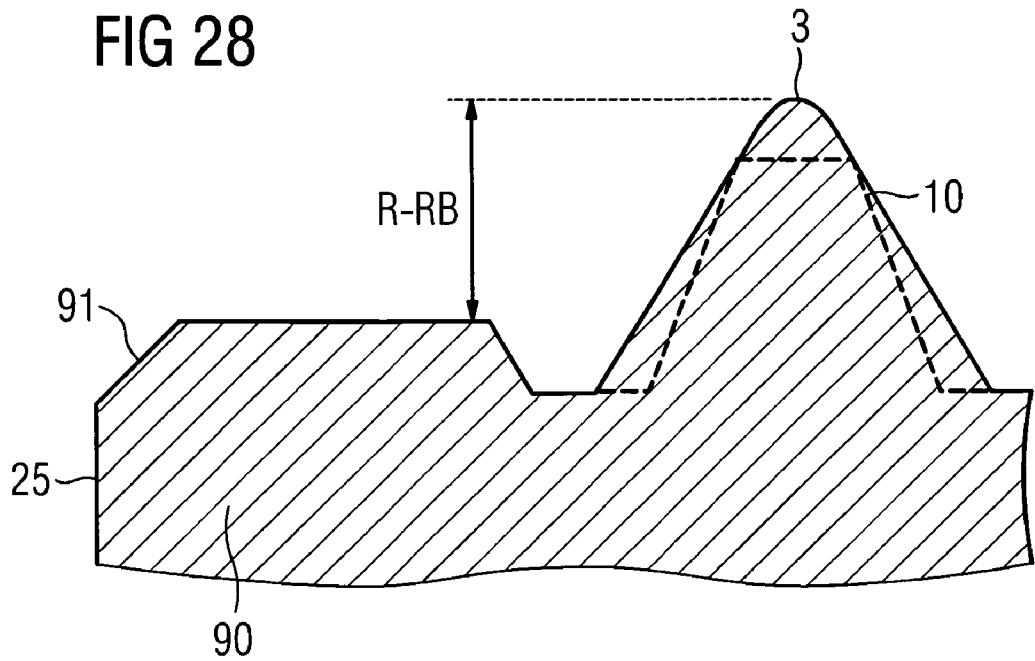
FIG. 28 shows a longitudinal section through the front part of the tool according to FIG. 27.

In FIG. 28 the front region of the tool according to FIG. 27 is shown in longitudinal section. The difference between the radial dimensions is given by the value R-RB, i.e. is found by subtracting the radius RB of the circumferential drilling edge 92 from the radius R of the thread-grooving tooth 3.

In the exemplary embodiment shown in FIGS. 27 and 28 the thread-producing regions 10 to 14 each comprise four thread-forming teeth and four thread-milling teeth and are each constructed with four-fold rotational symmetry. The chip channels and the thread-producing regions 10 to 14 are disposed in a twisted configuration, which results in smoother operation and improves the process of transporting the removed material away in the direction of rotation of the tool 20.

Figure 29:
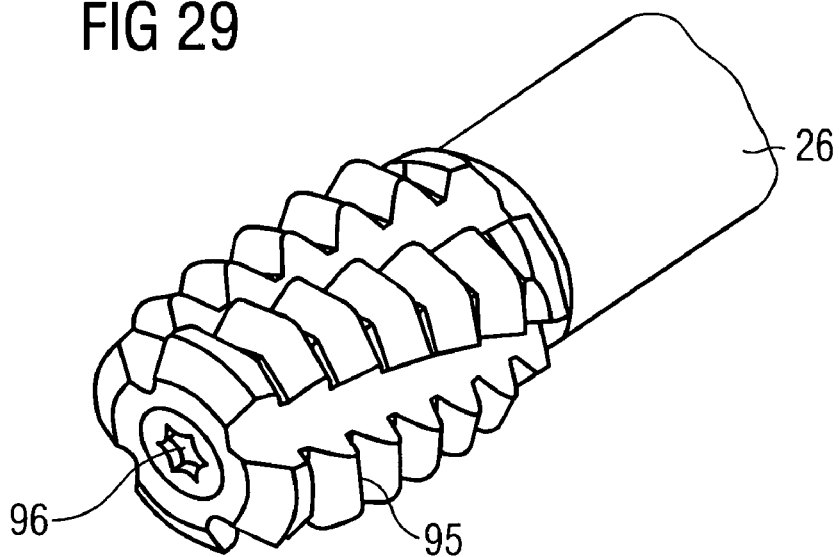
FIG. 29 shows a tool with a circular drill part as well as a removable tool head.

FIG. 29 shows a tool with a machining head 95 constructed like that in FIGS. 27 and 28, as a composite of drilling and thread-producing parts, which is a prefabricated component that can be set onto the shaft 26 or attached to its end face, by means of a screw 96 or screw-type connection in the example in FIG. 29.

Figure 30:
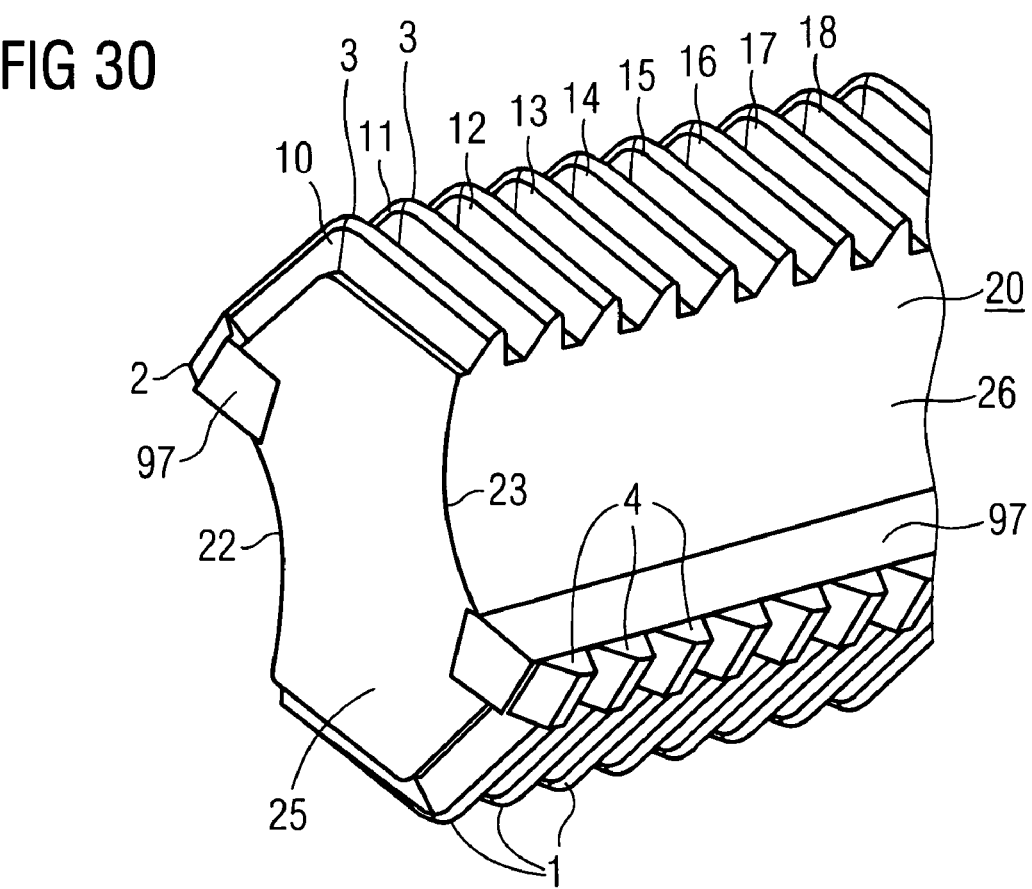
FIG. 30 shows a tool with separately insertable thread-milling elements.

FIG. 30 shows a modified embodiment of a tool according to FIGS. 1 and 2, in which the milling teeth 2 and 4 are not produced integrally, together with the thread-grooving teeth 3 and 4, in a material of which the shaft 26 is made, but rather are attached as prefabricated parts to the prefabricated shaft comprising thread-forming teeth. In the exemplary embodiment according to FIG. 30 the individual thread-milling teeth are disposed on a common milling element 97, which has the form of a strip or rail or milling web. This strip-shaped milling element 97 is set into a corresponding recess in the shaft 26 and fixed there, in particular with fusion of material, for example by soldering, or also in a force locking and/or shape locking manner, for example by clamps or screws. The thread-producing regions 10 to 18 in this exemplary embodiment are thus constructed or composed of three prefabricated parts.

Figure 31:
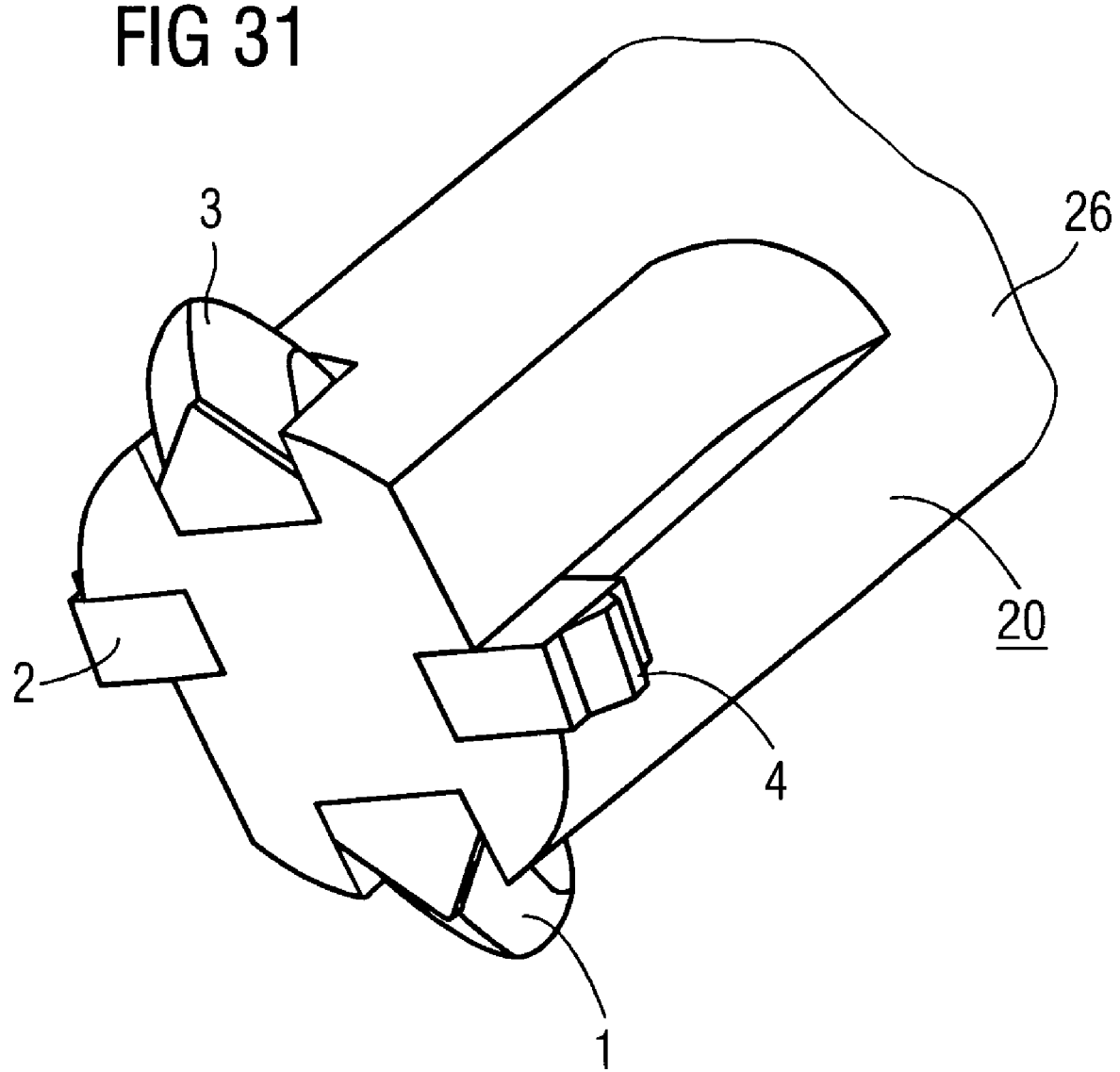
FIG. 31 shows a tool with separately insertable thread-forming and thread-milling elements.

FIG. 31 shows an exemplary embodiment in which both the thread-milling teeth and the thread-grooving teeth are provided individually as prefabricated parts, or are provided in prefabricated elements, and are received in corresponding recesses in the tool shaft 26 and fixed in position there. In the exemplary embodiment according to FIG. 31 only one thread-producing region is provided, with four prefabricated parts disposed in sequence around the circumference so as to be offset from one another by 90°; here two of the prefabricated parts each bear a milling tooth 2 or 4, respectively, and two prefabricated parts each bear a grooving tooth 1 or 3.

Figure 36:
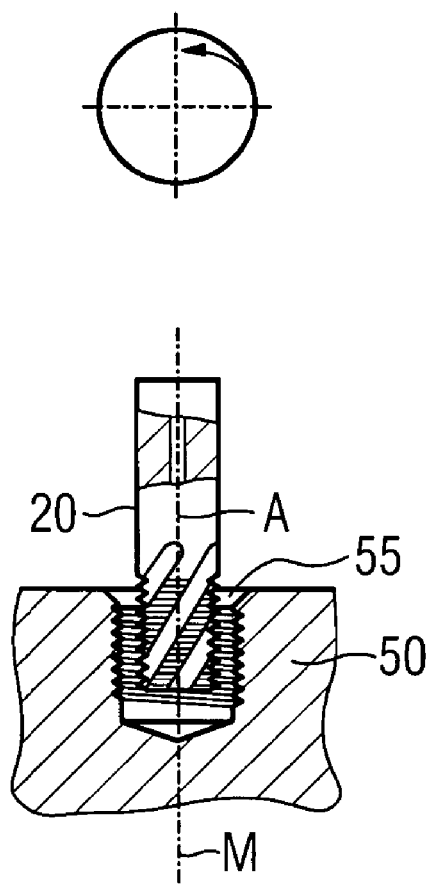

In FIG. 32 to 37 a typical machining method employing a tool 20 in accordance with the invention is illustrated. First the tool 20 is positioned so that its tool axis A is coaxial with a central axis M of a bore 55 in the workpiece 50. From this starting position the tool 20 is now introduced into the bore 55 in the workpiece 50 by means of a linear forward movement that is axial with respect to the tool axis A and central axis M, in particular it is inserted to the depth of the thread. Now with an inward curved movement the tool 20 as shown in FIG. 34 is radially shifted to the inner wall of the bore 55. As shown in FIG. 35, the tool 20 is now moved in a circular movement about the central axis M while simultaneously being moved forward parallel to the tool axis A; the number of circles the tool axis A makes about the axis M is given by the number of thread-producing regions on one hand and the number of desired thread turns on the other. As a result, the tool 20 produces in the interior wall of the bore 55 an internal thread with a pitch determined by the velocity of forward movement and the distance separating the individual thread-producing regions of the tool 20. After this helical processing movement according to FIG. 35 has been completed, the tool 20 is shifted radially back to the middle as shown in FIG. 36, so that the tool axis A and the central axis M again coincide with one another. For this return movement, again, a withdrawal outward curved movement is provided.

Figure 37:
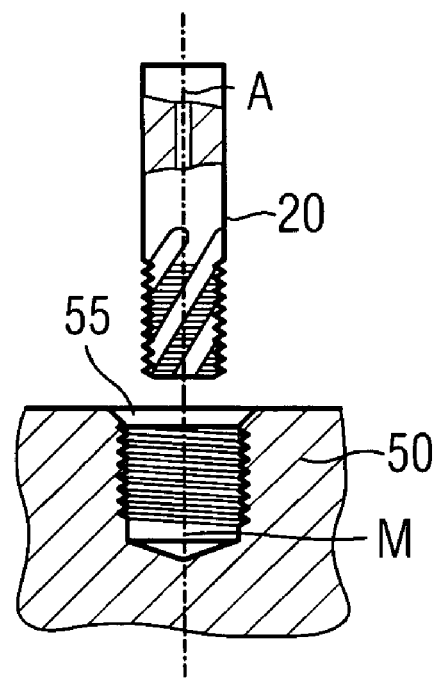

As illustrated in FIG. 37, in an axial retraction movement the tool 20 is moved back out of the bore axially, with respect to the central axis M, and returned to its initial position. Now a new thread can be produced in another workpiece or at another place in the same workpiece 50. The central axis M of the internal thread produced in the bore 55 coincides with the central axis for the circular movement made by the tool 20 during the processing shown in FIG. 35. For most applications the tool, usually after production of the thread, is retracted or brought out of the workpiece in a retraction direction opposite to the forward direction in order to be able to operate on a new workpiece. In this case the tool usually continues to be rotated about its tool axis so that no processing time is lost in starting up the rotation drive mechanism.

FIG. 38 shows a tool 2 with two forming-tooth arrangements 125 and 126 offset from one another by 180°, each of which comprises five outwardly directed forming teeth, and two milling-tooth arrangements 127 and 128, each of which is offset by 90° from the forming-tooth arrangements and comprises five milling teeth, such that one forming tooth and one milling tooth in each arrangement 125 to 128 is disposed at the same axial height. The forming-tooth arrangements 125 and 126 and the milling-tooth arrangements 127 and 128 are in each case prefabricated parts, each fixed within a recess in the shaft 3. The milling-tooth arrangements 127 and 128 are constructed as axial strips and disposed next to chip channels in the shaft 3. The forming-tooth arrangements 125 and 126 comprise five elements constructed as turning elements, each with four forming teeth, each of which can be employed by rotating the forming-tooth arrangement 125 and 126 or the turning elements about their central axis or the screw axis of a fixation screw.

In all embodiments more than one, e.g. two or more, forming teeth can be arranged between two cutting teeth in the direction of rotation or in the circumferential direction and/or more than one, e.g. two or more, cutting teeth can be arranged between two forming teeth in the rotational or circumferential direction. In this embodiment a forming section could be considered to contain more than one forming teeth and/or cutting section more than one cutting teeth.

LIST OF REFERENCE SIGNS

1 Thread-forming tooth
1A, 1B Tooth flanks
1C Tooth head
2 Thread-milling tooth
2A, 2B Tooth flanks
2C Tooth head
3 Thread-forming tooth
4 Thread-milling tooth
7 Thread-milling tooth
8 Thread-forming tooth
10A Subregion
10B Subregion
10 to 18 Thread-producing regions
20 Tool
21 Ground-down surface
22, 23 Channel
25 End face
24 Ground-down surfaces
26 Tool shaft
40 Drill tip
41, 42 End-face drilling edges
43, 44 Circumferential drilling edges
50 Workpiece
51 Surrounding region
54 Fixation
55 Bore
70, 71 Milling-profile regions
73 Thread-milling profile region
82, 83 Forming regions
90 Drill part
91 End-face drilling edge
92 Circumferential drilling edge
95 Machining head
96 Screw
97 Milling element
125, 126 Forming-tooth arangement
127, 128 Milling-tooth arrangement
201, 204 Chip channels
A Tool axis
D Direction of rotation
M Central axis
R Outside radius
Ri Inside radius of the thread
Ra Outside radius of the thread
L1, L3 Length
L2 Length
G Thread
G' Thread profile
G1, G1' Thread region
G2, G2' Thread region
G3, G3' Thread region
G4, G5 Thread flanks
G6 Thread base
P1, P2 Intersection points
VB Forward movement
ZB Circular movement Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth uncorrected in degrees Celsius and, all parts and percentages are by weight, unless otherwise indicated.

The entire disclosures of all applications, patents and publications, cited herein and of corresponding German application No. 102004059264.0, filed Dec. 8, 2004, are hereby incorporated by reference.

From the foregoing description, one skilled in the art can easily ascertain the essential characteristics of this invention and, without departing from the spirit and scope thereof, can

The invention claimed is:

1. A tool for producing a thread in a workpiece, comprising:
   a) at least one thread-producing region, which comprises
   a1) at least one thread-milling region, which operates by removing material, and
   a2) at least one thread-forming region, which operates without the removal of material,
   b) wherein at least one thread-milling region and at least one thread-forming region of at least one thread-producing region
   b1) are coupled or connected to one another to be rotatable together about a tool axis, and
   b2) are arranged along an outer circumference of the thread-producing region and are positioned one behind the other in a direction of rotation about the tool axis;
   b3) wherein at least one thread-milling region and at least one associated thread-forming region of at least one thread-producing region are so arranged and formed that during rotation about the tool axis in a predetermined direction of rotation they rotationally engage the workpiece in alternation or one after the other.

2. The tool according to claim 1, wherein:
   a) an effective profile of each thread-producing region corresponds to a prespecified nominal profile or prespecified final profile of the thread to be produced,
   b) the effective profile of each thread-producing region corresponding to the profile of a rotational projection of its thread-milling and thread-forming regions about the tool axis onto a projection plane passing through the tool axis.

3. The tool according to claim 1, wherein at least one thread-producing region comprises several thread-milling regions and/or several thread-forming regions and a rotational projection of at least two and optionally all of these thread-milling regions and/or a rotational projection of at least two and optionally all of these thread-forming regions about the tool axis onto a projection plane passing through or containing the tool axis are identical to one another.

4. The tool according to claim 1, wherein at least one thread-producing region comprises several thread-milling regions and/or several thread-forming regions and a rotational projection of at least two and optionally all of these thread-milling regions and/or a rotational projection of at least two and optionally all of these thread-forming regions about the tool axis onto a projection plane passing through the tool axis are different from one another.

5. The tool according to claim 1, wherein the thread-milling region(s) and the thread-forming region(s) of at least one thread-producing region together produce the thread profile of the thread, during an operational movement of the tool that comprises a rotational movement of the tool about the tool axis in a predetermined direction of rotation, a simultaneous axial forward movement of the tool, axial with respect to the tool axis, and a simultaneous rotational movement of the tool axis of the tool around a central axis that does not pass through the tool and is parallel to the tool axis.

6. The tool according to claim 1, wherein:
   a) in at least one, optionally every thread-producing region, effective profiles of thread-milling region(s) and thread-forming region(s) are adjusted to one another in such a way that
   a1) at least one first subregion of the effective profile of the entire thread-producing region exclusively matches the effective profile of the or all thread-forming region(s), and
   a2) at least one second subregion of the effective profile of the entire thread-producing region exclusively matches the effective profile of the or all thread-milling region(s);
   b) such that the effective profile of each thread-milling region or each thread-forming region corresponds to a rotational projection of this thread-milling region or this thread-forming region about the tool axis onto a projection plane that passes through or contains the tool axis.

7. The tool according to claim 6, further comprising a central subregion, composed of the effective profile of the or all thread-forming region(s) as the first subregion of the effective profile of the entire thread-producing region, and also two subregions adjacent to the central subregion, one on each side, which are composed of the effective profile of the or all thread-milling region(s) as second subregions of the effective profile of the entire thread-producing region.

8. The tool according to claim 6, further comprising a central subregion, composed of the effective profile of the or all thread-milling region(s) as the second subregion of the effective profile of the entire thread-producing region, and also two subregions adjacent to the central subregion, one on each side, which are composed of the effective profile of the or all thread-forming region(s) as first subregions of the effective profile of the entire thread-producing region.

9. The tool according to claim 6, wherein next to the subregions of the effective profile of the entire thread-producing region that are situated adjacent to a central subregion of the effective profile of the entire thread-producing region, on their sides facing away from the central subregion, there are disposed additional subregions of the effective profile of the entire thread-producing region, which are composed of the effective profile of all thread-forming region(s) or all thread-milling region(s).

10. The tool according to claim 1, wherein at least one thread-producing region has a subregion of an effective profile of each thread-milling region lying within an effective profile of at least one thread-forming region and a subregion of the effective profile of at least one thread-forming region lying within the effective profile of at least one thread-milling region.

11. The tool according to claim 1, wherein at least one thread-producing region has thread-milling region(s) and thread-forming region(s) constructed and disposed in such a way that the surface of the thread turn produced in the workpiece by this thread-producing region is partly milled and partly formed.

12. The tool according to claim 1, wherein at least one thread-producing region is constructed so as to be rotationally symmetrical with respect to the tool axis, with an n-fold rotational symmetry wherein the integer number n is greater than 1.

13. The tool according to claim 1, wherein at least two thread-producing regions are provided, which are axially offset from one another, with respect to the tool axis.

14. The tool according to claim 1, wherein the thread-producing region(s) is/are so constructed and disposed that during rotation of the tool about the tool axis, with simultaneous rotation of the tool axis about a central axis at a constant rotational velocity as well as with simultaneous forward movement of the tool in a direction axial with respect to the tool axis and at constant forward velocity, as the thread-producing region(s) engage a cylindrical workpiece surface it/they produces/produce a thread with a constant pitch determined by the forward velocity.

15. The tool according to claim 1, wherein at least one thread-forming region comprises at least one forming tooth, forming wedge or pressure lug that projects radially outward, and/or wherein at least one thread-forming region in a cross section perpendicular to the tool axis has a shape derived from part of a regular polygon, such that the polygon has a number of corners equal to two or three or four or five or six, the corner regions of the at least approximately polygonal cross section of the thread-forming regions constituting forming teeth, forming wedges or pressure lugs.

16. The tool according to claim 1, wherein at least one thread-producing region comprises at least one ridge or several ridges offset from one another and separated from one another by separation channels, the ridge(s) being oriented perpendicular to the tool axis and projecting radially outward, such that on at least one or on every ridge belonging to at least one thread-producing region there is constructed at least one forming tooth, forming wedge or pressure lug that extends radially outward further than the surrounding regions of the ridge, and/or such that as viewed in a prespecified direction of rotation at an end region of at least one or each ridge of at least one thread-producing region a thread-milling region is constructed.

17. The tool according to claim 1, further comprising at least one additional material-removing region in addition to the thread-milling region(s), such that at least one additional material-removing region is constructed and provided for producing a workpiece surface for the thread, and at least one thread-producing region is constructed and provided for producing the thread in this workpiece surface, and/or such that at least one additional material-removing region is constructed and provided for removing material in order to produce a preliminary thread in a workpiece surface, and at least one thread-producing region is constructed and provided for finishing the thread by subsequent processing of the preliminary thread in the workpiece surface.

18. The tool according to claim 17, wherein at least one additional material-removing region is a drill region or a milling region, or comprises at least one end-face cutting edge at an end face or free end of the tool and/or at least one circumferential cutting edge at a circumferential region of the tool, or wherein at least one additional material-removing region is constructed and provided for producing an entrance or opening region of the thread that is enlarged, in comparison to a thread core, and/or is stepped or chamfered.

19. The tool according to claim 1, further comprising at least one additional thread-forming region that operates without removing material, for the purpose of subsequent processing and/or smoothing of the thread turns or thread flanks of the thread produced by the thread-producing region(s).

20. The tool according to claim 17, wherein:
a) a first material-removing region comprises at least one preprocessing cutting edge for the removal of material,
b) next to the first material-removing region there is at least one thread-producing region for production of a thread,
c) next to the at least one thread-producing region there is a second material-removing region with at least one core cutter for the subsequent cutting or levelling of the thread core of the thread produced by the thread-producing region, and
d) next to the second material-removing region there is an additional thread-forming region for the subsequent processing and/or levelling of the thread turns or thread flanks of the thread produced by the thread-producing region(s).

21. A method for producing a thread in a workpiece, comprising:
a) moving a tool according to claim 1
b) in a processing movement, comprising:
b1) a rotational movement of the tool about the tool axis in a prespecified direction of rotation,
b2) a simultaneous axial forward movement of the tool, axial with respect to the tool axis, and
b3) a simultaneous circular movement of the tool, wherein the tool axis of the tool rotates about a central axis of rotation that is oriented parallel to the tool axis.

22. A method according to claim 21, wherein at least during part of the processing movement of the tool, at first at least one thread-forming region produces part of a thread turn or recesses it further into the workpiece by forming rather than removing the material, and subsequently at least one thread-milling region further processes the part of the thread turn produced or processed in the workpiece by the thread-forming region, and/or wherein the workpiece surface in the thread turn produced by at least one thread-producing region is partially milled and partially formed, and/or wherein a thread base of the thread turn in the workpiece is formed by the at least one thread-forming region and two thread flanks adjacent to the thread base are at least partially milled by the at least one thread-milling region, and/or wherein a thread base of the thread turn in the workpiece is milled by the at least one thread-milling region and two thread flanks adjacent to the thread base are at least partially formed by the at least one thread-forming region.

23. A method according to claim 21, wherein during the processing movement at least a number of thread turns corresponding to the number of thread-producing regions of the tool is produced.

24. A tool for producing a thread in a workpiece, comprising:
a) at least one thread-producing region, which comprises
a1) at least one thread-milling region, which operates by removing material, and
a2) at least one thread-forming region, which operates without the removal of material,
b) wherein at least one thread-milling region and at least one thread-forming region of at least one thread-producing region
b1) are coupled or connected to one another to be rotatable together about a tool axis, and
b2) are arranged along an outer circumference of the thread-producing region and are positioned one behind the other substantially perpendicular to and in a direction of rotation about the tool axis.

25. A tool for producing a thread in a workpiece, comprising:
a) at least one thread-producing region, which comprises
a1) at least one thread-milling region, which operates by removing material, and
a2) at least one thread-forming region, which operates without the removal of material,
b) wherein at least one thread-milling region and at least one thread-forming region of at least one thread-producing region
b1) are coupled or connected to one another to be rotatable together about a tool axis, and
b2) are arranged along an outer circumference of the thread-producing region and are positioned at an angular distance one behind the other in a direction of rotation about the tool axis.

26. A tool for producing a thread in a workpiece, comprising:

a) at least one thread-producing region, which comprises
a1) at least one thread-milling region, which operates by removing material, and
a2) at least one thread-forming region, which operates without the removal of material,
b) wherein at least one thread-milling region and at least one thread-forming region of at least one thread-producing region b1) are coupled or connected to one another to be rotatable together about a tool axis, and
b2) are arranged along an outer circumference of the thread-producing region and are positioned at an angular distance following one another in a direction of rotation about the tool axis.

* * * * *

UNITED STATES PATENT AND TRADEMARK OFFICE
CERTIFICATE OF CORRECTION

| | | |
|---|---|---|
| PATENT NO. | : 7,399,231 B2 | Page 1 of 1 |
| APPLICATION NO. | : 11/295668 | |
| DATED | : July 15, 2008 | |
| INVENTOR(S) | : Glimpel et al. | |

It is certified that error appears in the above-identified patent and that said Letters Patent is hereby corrected as shown below:

On Title page,

Item [73], ASSIGNEE:
    reads "EMUGE-Werk Richard Glimpel GmbH & Co. KG (Lauf, DE)",
    should read --EMUGE-Werk Richard Glimpel GmbH & Co. KG Fabrik für Präzisionswerkzeuge (Lauf, DE)--

Signed and Sealed this

Seventeenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,399,231 B2
APPLICATION NO. : 11/295668
DATED : July 15, 2008
INVENTOR(S) : Glimpel et al.

It is certified that error appears in the above-identified patent and that said Letters Patent is hereby corrected as shown below:

Title page Item [73] change

"EMUGE-Werk Richard Glimpel GmbH & Co. KG (Lauf, DE)" to:

-- EMUGE-Werk Richard Glimpel GmbH & Co. KG Fabrik für Präzisionswerkzeuge (Lauf, DE) --.

Signed and Sealed this

Twenty-first Day of April, 2009

JOHN DOLL
*Acting Director of the United States Patent and Trademark Office*